United States Patent
Zhang et al.

(10) Patent No.: US 11,540,315 B2
(45) Date of Patent: Dec. 27, 2022

(54) METHOD FOR CONFIGURING RANDOM ACCESS CHANNEL TRANSMITTING RESOURCE AND DEVICE THEREOF

(71) Applicants: Sharp Kabushiki Kaisha, Sakai (JP); FG Innovation Company Limited, Tuen Mun (HK)

(72) Inventors: Meng Zhang, Shanghai (CN); Chao Luo, Shanghai (CN)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 196 days.

(21) Appl. No.: 16/762,997

(22) PCT Filed: Nov. 14, 2018

(86) PCT No.: PCT/CN2018/115427
§ 371 (c)(1),
(2) Date: May 11, 2020

(87) PCT Pub. No.: WO2019/096164
PCT Pub. Date: May 23, 2019

(65) Prior Publication Data
US 2020/0404701 A1     Dec. 24, 2020

(30) Foreign Application Priority Data
Nov. 15, 2017 (CN) .......................... 201711133700.8

(51) Int. Cl.
H04W 4/00 (2018.01)
H04W 74/00 (2009.01)
(Continued)

(52) U.S. Cl.
CPC ......... *H04W 74/008* (2013.01); *H04L 5/1469* (2013.01); *H04W 72/0446* (2013.01); *H04W 74/0833* (2013.01)

(58) Field of Classification Search
CPC .......... H04W 74/008; H04W 72/0446; H04W 74/0833; H04L 5/1469
See application file for complete search history.

(56) References Cited

U.S. PATENT DOCUMENTS

| | | |
|---|---|---|
| 2013/0195048 A1 | 8/2013 | Ekpenyong et al. |
| 2013/0242730 A1 | 9/2013 | Pelletier et al. |

(Continued)

FOREIGN PATENT DOCUMENTS

| | | |
|---|---|---|
| CN | 103973412 A | 8/2014 |
| CN | 104349476 A | 2/2015 |

(Continued)

OTHER PUBLICATIONS

Official Communication issued in International Patent Application No. PCT/CN2018/115427, dated Jan. 30, 2019.
(Continued)

*Primary Examiner* — Siren Wei
(74) *Attorney, Agent, or Firm* — ScienBiziP, P.C.

(57) ABSTRACT

The present invention provides a method for configuring a random access channel transmitting resource in a time division duplexing (TDD) mode and a device thereof. The method comprises generating configuration information for indicating a random access channel transmitting resource. The configuration information comprises period indicating information for indicating a configured period of the random access channel transmitting resource, and/or offset indicating information for indicating an offset of the random access channel transmitting resource in the configured period. The (Continued)

method further comprises transmitting the configuration information to user equipment (UE).

3 Claims, 7 Drawing Sheets

(51) Int. Cl.
*H04L 5/14* (2006.01)
*H04W 72/04* (2009.01)
*H04W 74/08* (2009.01)

(56) References Cited

U.S. PATENT DOCUMENTS

2019/0075602 A1* 3/2019 Lin .................. H04W 74/0833
2020/0245363 A1* 7/2020 Kim ...................... H04B 1/713
2020/0314910 A1* 10/2020 Höglund ............... H04W 48/10

FOREIGN PATENT DOCUMENTS

| CN | 106162921 A | 11/2016 |
| CN | 106973441 A | 7/2017 |
| EP | 3 404 991 A1 | 11/2018 |
| WO | 2017/160221 A1 | 9/2017 |

OTHER PUBLICATIONS

Ericsson, "On the UL of NB-IoT TDD", 3GPP TSG-RAN WG1 Meeting #90bis, R1-1717022, Oct. 9-13, 2017, pp. 1-14.
Center of Excellence in Wireless Technology (CEWiT), "NPRACH design aspects for the support of TDD NB-IoT", 3GPP TSG-RAN WG1 #90b, R1-1717712, Oct. 9-13, 2017, pp. 1-5.
"LTE; Evolved Universal Terrestrial Radio Access (E-UTRA); Physical channels and modulation (3GPP TS 36.211 version 13.7.1 Release 13)", ETSI TS 136 211 V13.7.1, Oct. 2017, pp. 1-173.
Qualcomm Incorporated, "New Work Item: NarrowBand IOT (NB-IOT)", 3GPP TSG RAN Meeting #69, RP-151621, Sep. 14-16, 2015, 8 pages.
Sharp, "Random access for eNB-IoT", 3GPP TSG-RAN WG2#95bis Kaohsiung, Oct. 10-14, 2016, R2-166405.

* cited by examiner

| NUMBER OF UL SUBFRAMES | CP LENGTH (μs) | SYMBOL LENGTH (μs) | NUMBER OF SYMBOLS IN ONE SG | SG LENGTH (μs) | 2SG LENGTH (μs) | GT LENGTH (μs) |
|---|---|---|---|---|---|---|
| 3 | 266.7 | 266.7 | 4 | 1333.4 | 2667 | 333 |
| | 66.7 | 266.7 | 5 | 1400.2 | 2800.4 | 199.6 |
| 2 | 266.7 | 266.7 | 2 | 800.1 | 1600.2 | 399.8 |
| | 66.7 | 266.7 | 3 | 866.8 | 1733.6 | 266.4 |
| 1 | 66.7 | 266.7 | 1 | 333.4 | 666.8 | 333.2 |

FIG. 3

METHOD FOR CONFIGURING RANDOM ACCESS CHANNEL TRANSMITTING RESOURCE AND DEVICE THEREOF

CROSS-REFERENCE TO RELATED APPLICATIONS

The present application claims priority to Chinese Patent Application (Application No. 201711133700.8) filed on Nov. 15, 2017 and entitled "METHOD FOR CONFIGURING RANDOM ACCESS CHANNEL TRANSMITTING RESOURCE AND DEVICE THEREOF," which is incorporated herein by reference in its entirety.

TECHNICAL FIELD

The present invention relates to the field of wireless communications technologies. More specifically, the present invention relates to a method for configuring a random access channel transmitting resource and a device thereof.

BACKGROUND

For better implementation of the Internet of Everything, at the 3GPP RAN #69 plenary meeting held in September 2015, a new work item was further proposed (see non-patent literature: RP-151621 New Work Item: NarrowBand IoT (NB-IoT)), which is called Narrowband Internet of Things (NB-IoT). In the description of this item, NB-IoT user equipment (UE) will support uplink/downlink 180 KHz RF bandwidth. It was determined at the 3GPP RAN1 #83 meeting held in November 2015 that uplink transmission of NB-IoT supports three transmission modes including single-tone 3.75 kHz, single-tone 15 kHz, and multi-tone 15 kHz.

Indication of NPRACH time-domain resource configuration in an FDD mode was determined in the aforementioned meeting. However, the indication for FDD cannot be completely reused for indication of a time-domain resource for transmitting an NPRACH in a TDD mode. The reason is that uplink and downlink subframe configuration unique to TDD determines that uplink subframes thereof occur only at some specific subframe positions, while the existing intra-period offset indication of an NPRACH in FDD cannot ensure that a subframe indicated thereby is definitely an uplink subframe in the TDD mode.

Thus, there is a need for an NPRACH time-domain resource indication scheme in the TDD mode capable of solving the aforementioned problems.

SUMMARY

In order to solve at least some of the aforementioned problems, embodiments of the present invention provide a method for configuring a random access channel transmitting resource and a device thereof.

According to one aspect of the embodiments of the present invention, a method for configuring a random access channel transmitting resource in a time division duplexing (TDD) mode is provided. The method comprises: generating configuration information for indicating a random access channel transmitting resource. The configuration information comprises period indicating information for indicating a configured period of the random access channel transmitting resource, and/or offset indicating information for indicating an offset of the random access channel transmitting resource in the configured period. The method further comprises transmitting the configuration information to user equipment (UE).

By generating configuration information comprising period indicating information and offset indicating information and transmitting the configuration information to UE, a resource for uplink transmission in a TDD mode can be clearly specified in a form similar to indication in FDD, thereby solving the problems in the prior art.

In some examples, the configured period may be in units of milliseconds.

In some examples, the offset indicated by the offset indicating information may be in units of milliseconds, radio frames, or half radio frames.

In some examples, in the case that the offset indicating information is in units of radio frames, the random access channel transmitting resource may be configured at the following position: a second subframe in a radio frame; a seventh subframe in a radio frame; or a second or seventh subframe in a radio frame.

In some examples, in the case that the offset indicating information is in units of half radio frames, the random access channel transmitting resource may be configured at the following position: a second subframe in a half radio frame.

According to another aspect of the embodiments of the present invention, a device for configuring a random access channel transmitting resource in a time division duplexing (TDD) mode is provided. The device comprises a configuration information generating module and a transmission module. The configuration information generating module is configured to generate configuration information for indicating a random access channel transmitting resource. The configuration information comprises period indicating information for indicating a configured period of the random access channel transmitting resource, and/or offset indicating information for indicating an offset of the random access channel transmitting resource in the configured period. The transmission module is configured to transmit the configuration information to user equipment (UE).

In some examples, the configured period may be in units of milliseconds.

In some examples, the offset indicated by the offset indicating information may be in units of milliseconds, radio frames, or half radio frames.

In some examples, in the case that the offset indicating information is in units of radio frames, the random access channel transmitting resource may be configured at the following position: a second subframe in a radio frame; a seventh subframe in a radio frame; or a second or seventh subframe in a radio frame.

In some examples, in the case that the offset indicating information is in units of half radio frames, the random access channel transmitting resource may be configured at the following position: a second subframe in a half radio frame.

According to another aspect of the embodiments of the present invention, a device for configuring a random access channel transmitting resource in a time division duplexing (TDD) mode is further provided. The device comprises at least one processor and a memory in communicating connection to the at least one processor. The memory stores instructions executable by the at least one processor, and the instructions are executed by the at least one processor to enable the at least one processor to perform any of the methods described above.

According to another aspect of the embodiments of the present invention, a method for configuring a random access channel transmitting resource in a time division duplexing (TDD) mode is further provided. The method comprises receiving, from a network side, configuration information for indicating a random access channel transmitting resource. The configuration information comprises period indicating information for indicating a configured period of the random access channel transmitting resource, and/or offset indicating information for indicating an offset of the random access channel transmitting resource in the configured period. The method further comprises performing TDD uplink transmission based on the configuration information.

In some examples, the performing TDD uplink transmission based on the configuration information comprises transmitting a random access signal on a resource satisfying one of the following equations:

(SFN−Intra-resource period offset) mod (Resource period/Length of radio frame)=0, where the SFN is a current system frame number, the intra-resource period offset is the offset indicated by the offset indicating information and is in units of radio frames, and the resource period is the configured period indicated by the period indicating information, or (SFN−Intra-resource period offset/Length of radio frame) mod (Resource period/Length of radio frame)=0, where the SFN is a current system frame number, the intra-resource period offset is the offset indicated by the offset indicating information and is in units of milliseconds, and the resource period is the configured period indicated by the period indicating information, or (H-SFN−Intra-resource period offset) mod (Resource period/Length of radio frame)=0, where the H-SFN is a current half system frame number, the intra-resource period offset is the offset indicated by the offset indicating information and is in units of half radio frames, and the resource period is the configured period indicated by the period indicating information, or (H-SFN−Intra-resource period offset/Length of half radio frame) mod (Resource period/Length of radio frame)=0, where the H-SFN is a current half system frame number, the intra-resource period offset is the offset indicated by the offset indicating information and is in units of milliseconds, and the resource period is the configured period indicated by the period indicating information.

According to another aspect of the embodiments of the present invention, a device for configuring a random access channel transmitting resource in a time division duplexing (TDD) mode is further provided. The device comprises a receiving module and a transmission executing module. The receiving module is configured to receive, from a network side, configuration information for indicating a random access channel transmitting resource. The configuration information comprises period indicating information for indicating a configured period of the random access channel transmitting resource, and/or offset indicating information for indicating an offset of the random access channel transmitting resource in the configured period. The transmission executing module is configured to perform TDD uplink transmission based on the configuration information.

According to another aspect of the embodiments of the present invention, a device for configuring a random access channel transmitting resource in a time division duplexing (TDD) mode is further provided. The device comprises at least one processor and a memory in communicating connection to the at least one processor. The memory stores instructions executable by the at least one processor, and the instructions are executed by the at least one processor to enable the at least one processor to perform any of the methods described above.

According to another aspect of the embodiments of the present invention, a computer-readable storage medium is further provided. The computer-readable storage medium stores executable instructions. When executed by a processor, the instructions cause the processor to perform any one of the methods described above.

By generating configuration information comprising period indicating information and offset indicating information and transmitting the configuration information to UE, the technical solutions provided in the embodiments of the present invention can clearly specify a resource for uplink transmission in a TDD mode in a form similar to indication in FDD, thereby solving the problems in the prior art.

BRIEF DESCRIPTION OF THE DRAWINGS

The above and other features of the present invention will be more apparent from the following detailed description taken in conjunction with the accompanying drawings, wherein:

FIG. 3 schematically shows different preamble formats;

DETAILED DESCRIPTION

The present invention is described in detail below with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

In the following description, a 5G mobile communication system and its later evolved versions are used as exemplary application environments to set forth a plurality of embodiments according to the present invention in detail. However, it is to be noted that the present invention is not limited to the following embodiments, but is applicable to more other wireless communication systems, such as a communication system later than 5G and a 4G mobile communication system earlier than 5G.

Some terms involved in the present disclosure are described below. If not specifically indicated, the terms involved in the present disclosure use the definitions herein. The terms given in the present disclosure may be named differently in LTE, LTE-Advanced, LTE-Advanced Pro, NR, and later communication systems, but unified terms are used in the present disclosure. When applied to a specific system, the terms may be replaced with terms used in the corresponding system.

LTE-A: Long Term Evolution-Advanced
UE: User Equipment
NR: New Radio
NPRACH: Narrow Band Physical Random Access Channel
SFN: System Frame Number
FDD: Frequency Division Duplexing
TDD: Time Division Duplexing In the example below, the technical solutions in the embodiments of the present invention are described by using NB-IoT and an NPRACH as an example. However, it should be noted that the technical solutions in the embodiments of the present invention are also applicable to non-NB-IoT systems, for example, may be used in any other systems that transmit data using a TDD mode. In these systems, the name of a random access channel used may not be NPRACH, but any other possible names corresponding to the used system.

The term "base station" is used in the following description. It should be noted that the technical solutions in the embodiments of the present invention are not limited to the term "base station," but are applicable to any one or a plurality of network-side devices capable of implementing a function performed at a base station described herein. According to different specific system implementations, such devices may be called a base station, an NB, an eNB, a network node, or the like.

Figure 1:
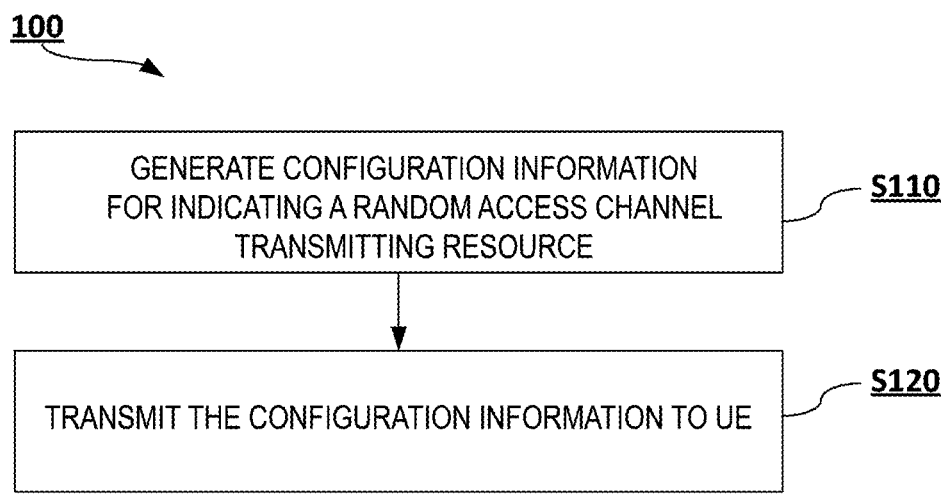
FIG. 1 schematically shows a flowchart of a method for generating an NPRACH time-domain resource indication in a TDD scenario.

FIG. 1 schematically shows a flowchart of a method 100 for generating an NPRACH time-domain resource indication in a TDD scenario. The method may be performed by a network-side device (for example, a base station).

As shown in FIG. 1, in step S110: Generate configuration information for indicating a random access channel transmitting resource. In the following description, configuration information for an NPRACH time-domain resource indication may be used as an example. However, it should be noted that the "NPRACH resource" below may be replaced with "random access channel transmitting resource."

As an example, the aforementioned configuration information may include at least one of the following indication information:

period indicating information for indicating a configured period of the NPRACH resource; and
offset indicating information for indicating an offset of the NPRACH resource in the configured period.

In some cases, one of the aforementioned two kinds of information may be, for example, predefined or default; in this case, the configuration information may include only the other kind of information. However, in some other examples, the configuration information may include the aforementioned two kinds of information, or may further include some other information according to specific implementation, which will not be described herein again.

The configuration information for the NPRACH time-domain resource indication may be carried by high layer signaling, for example, carried by RRC signaling; or may be carried by a PDCCH.

The period indicating information for the NPRACH resource indicates a configured period of the NPRACH resource.

As an example, the period indicated by the period indicating information for the NPRACH resource may be in units of milliseconds, and the value range thereof may be any of the following sets, where elements in the set are in units of milliseconds (ms):

{40, 80, 160, 240, 320, 640, 1280, 2560},
{40, 80, 160, 240, 320, 640, 1280, 5120},
{40, 80, 160, 240, 320, 640, 1280, 10240},
{40, 80, 160, 240, 320, 640, 2560, 5120},
{40, 80, 160, 240, 320, 640, 2560, 10240},
{40, 80, 160, 240, 320, 640, 5120, 10240},
{40, 80, 160, 240, 320, 1280, 2560, 5120},
{40, 80, 160, 240, 320, 1280, 2560, 10240},
{40, 80, 160, 240, 320, 1280, 5120, 10240},
{40, 80, 160, 240, 320, 2560, 5120, 10240},
{40, 80, 160, 240, 640, 1280, 2560, 5120},
{40, 80, 160, 240, 640, 1280, 2560, 10240},
{40, 80, 160, 240, 640, 1280, 5120, 10240},
{40, 80, 160, 240, 640, 2560, 5120, 10240},
{40, 80, 160, 240, 1280, 2560, 5120, 10240},
{40, 80, 160, 320, 640, 1280, 2560, 5120},
{40, 80, 160, 320, 640, 1280, 2560, 10240},
{40, 80, 160, 320, 640, 1280, 5120, 10240},
{40, 80, 160, 320, 640, 2560, 5120, 10240},
{40, 80, 160, 320, 1280, 2560, 5120, 10240},
{40, 80, 160, 640, 1280, 2560, 5120, 10240},
{40, 80, 240, 320, 640, 1280, 2560, 5120},
{40, 80, 240, 320, 640, 1280, 2560, 10240},
{40, 80, 240, 320, 640, 1280, 5120, 10240},
{40, 80, 240, 320, 640, 2560, 5120, 10240},
{40, 80, 240, 320, 1280, 2560, 5120, 10240},
{40, 80, 240, 640, 1280, 2560, 5120, 10240},
{40, 80, 320, 640, 1280, 2560, 5120, 10240},
{40, 160, 240, 320, 640, 1280, 2560, 5120},
{40, 160, 240, 320, 640, 1280, 2560, 10240},
{40, 160, 240, 320, 640, 1280, 5120, 10240},
{40, 160, 240, 320, 640, 2560, 5120, 10240},
{40, 160, 240, 320, 1280, 2560, 5120, 10240},
{40, 160, 240, 640, 1280, 2560, 5120, 10240},
{40, 160, 320, 640, 1280, 2560, 5120, 10240},
{40, 240, 320, 640, 1280, 2560, 5120, 10240},
{80, 160, 240, 320, 640, 1280, 2560, 5120},
{80, 160, 240, 320, 640, 1280, 2560, 10240},
{80, 160, 240, 320, 640, 1280, 5120, 10240},
{80, 160, 240, 320, 640, 2560, 5120, 10240},
{80, 160, 240, 320, 1280, 2560, 5120, 10240},
{80, 160, 240, 640, 1280, 2560, 5120, 10240},
{80, 160, 320, 640, 1280, 2560, 5120, 10240},
{80, 240, 320, 640, 1280, 2560, 5120, 10240},
{160, 240, 320, 640, 1280, 2560, 5120, 10240}.

As an example, the offset indicating information indicates an offset of the NPRACH resource within the period, where the indicated offset may be in units of radio frames.

Specifically, the offset indicated by the offset indicating information may be selected from any of the following sets, where elements in the set may be in units of radio frames or half radio frames:

{0, 1, 2, 4, 8, 16, 32, 48},
{0, 1, 2, 4, 8, 16, 32, 64},
{0, 1, 2, 4, 8, 16, 32, 96},
{0, 1, 2, 4, 8, 16, 32, 128},
{0, 1, 2, 4, 8, 16, 32, 192},
{0, 1, 2, 4, 8, 16, 48, 64},
{0, 1, 2, 4, 8, 16, 48, 96},

{0, 1, 2, 4, 8, 16, 48, 128},
{0, 1, 2, 4, 8, 16, 48, 192},
{0, 1, 2, 4, 8, 16, 64, 96},
{0, 1, 2, 4, 8, 16, 64, 128},
{0, 1, 2, 4, 8, 16, 64, 192},
{0, 1, 2, 4, 8, 16, 96, 128},
{0, 1, 2, 4, 8, 16, 96, 192},
{0, 1, 2, 4, 8, 16, 128, 192},
{0, 1, 2, 4, 8, 32, 48, 64},
{0, 1, 2, 4, 8, 32, 48, 96},
{0, 1, 2, 4, 8, 32, 48, 128},
{0, 1, 2, 4, 8, 32, 48, 192},
{0, 1, 2, 4, 8, 32, 64, 96},
{0, 1, 2, 4, 8, 32, 64, 128},
{0, 1, 2, 4, 8, 32, 64, 192},
{0, 1, 2, 4, 8, 32, 96, 128},
{0, 1, 2, 4, 8, 32, 96, 192},
{0, 1, 2, 4, 8, 32, 128, 192},
{0, 1, 2, 4, 8, 48, 64, 96},
{0, 1, 2, 4, 8, 48, 64, 128},
{0, 1, 2, 4, 8, 48, 64, 192},
{0, 1, 2, 4, 8, 48, 96, 128},
{0, 1, 2, 4, 8, 48, 96, 192},
{0, 1, 2, 4, 8, 48, 128, 192},
{0, 1, 2, 4, 8, 64, 96, 128},
{0, 1, 2, 4, 8, 64, 96, 192},
{0, 1, 2, 4, 8, 64, 128, 192},
{0, 1, 2, 4, 8, 96, 128, 192},
{0, 1, 2, 4, 16, 32, 48, 64},
{0, 1, 2, 4, 16, 32, 48, 96},
{0, 1, 2, 4, 16, 32, 48, 128},
{0, 1, 2, 4, 16, 32, 48, 192},
{0, 1, 2, 4, 16, 32, 64, 96},
{0, 1, 2, 4, 16, 32, 64, 128},
{0, 1, 2, 4, 16, 32, 64, 192},
{0, 1, 2, 4, 16, 32, 96, 128},
{0, 1, 2, 4, 16, 32, 96, 192},
{0, 1, 2, 4, 16, 32, 128, 192},
{0, 1, 2, 4, 16, 48, 64, 96},
{0, 1, 2, 4, 16, 48, 64, 128},
{0, 1, 2, 4, 16, 48, 64, 192},
{0, 1, 2, 4, 16, 48, 96, 128},
{0, 1, 2, 4, 16, 48, 96, 192},
{0, 1, 2, 4, 16, 48, 128, 192},
{0, 1, 2, 4, 16, 64, 96, 128},
{0, 1, 2, 4, 16, 64, 96, 192},
{0, 1, 2, 4, 16, 64, 128, 192},
{0, 1, 2, 4, 16, 96, 128, 192},
{0, 1, 2, 4, 32, 48, 64, 96},
{0, 1, 2, 4, 32, 48, 64, 128},
{0, 1, 2, 4, 32, 48, 64, 192},
{0, 1, 2, 4, 32, 48, 96, 128},
{0, 1, 2, 4, 32, 48, 96, 192},
{0, 1, 2, 4, 32, 48, 128, 192},
{0, 1, 2, 4, 32, 64, 96, 128},
{0, 1, 2, 4, 32, 64, 96, 192},
{0, 1, 2, 4, 32, 64, 128, 192},
{0, 1, 2, 4, 32, 96, 128, 192},
{0, 1, 2, 4, 48, 64, 96, 128},
{0, 1, 2, 4, 48, 64, 96, 192},
{0, 1, 2, 4, 48, 64, 128, 192},
{0, 1, 2, 4, 48, 96, 128, 192},
{0, 1, 2, 4, 64, 96, 128, 192},
{0, 1, 2, 8, 16, 32, 48, 64},
{0, 1, 2, 8, 16, 32, 48, 96},
{0, 1, 2, 8, 16, 32, 48, 128},
{0, 1, 2, 8, 16, 32, 48, 192},
{0, 1, 2, 8, 16, 32, 64, 96},
{0, 1, 2, 8, 16, 32, 64, 128},
{0, 1, 2, 8, 16, 32, 64, 192},
{0, 1, 2, 8, 16, 32, 96, 128},
{0, 1, 2, 8, 16, 32, 96, 192},
{0, 1, 2, 8, 16, 32, 128, 192},
{0, 1, 2, 8, 16, 48, 64, 96},
{0, 1, 2, 8, 16, 48, 64, 128},
{0, 1, 2, 8, 16, 48, 64, 192},
{0, 1, 2, 8, 16, 48, 96, 128},
{0, 1, 2, 8, 16, 48, 96, 192},
{0, 1, 2, 8, 16, 48, 128, 192},
{0, 1, 2, 8, 16, 64, 96, 128},
{0, 1, 2, 8, 16, 64, 96, 192},
{0, 1, 2, 8, 16, 64, 128, 192},
{0, 1, 2, 8, 16, 96, 128, 192},
{0, 1, 2, 8, 32, 48, 64, 96},
{0, 1, 2, 8, 32, 48, 64, 128},
{0, 1, 2, 8, 32, 48, 64, 192},
{0, 1, 2, 8, 32, 48, 96, 128},
{0, 1, 2, 8, 32, 48, 96, 192},
{0, 1, 2, 8, 32, 48, 128, 192},
{0, 1, 2, 8, 32, 64, 96, 128},
{0, 1, 2, 8, 32, 64, 96, 192},
{0, 1, 2, 8, 32, 64, 128, 192},
{0, 1, 2, 8, 32, 96, 128, 192},
{0, 1, 2, 8, 48, 64, 96, 128},
{0, 1, 2, 8, 48, 64, 96, 192},
{0, 1, 2, 8, 48, 64, 128, 192},
{0, 1, 2, 8, 48, 96, 128, 192},
{0, 1, 2, 8, 64, 96, 128, 192},
{0, 1, 2, 16, 32, 48, 64, 96},
{0, 1, 2, 16, 32, 48, 64, 128},
{0, 1, 2, 16, 32, 48, 64, 192},
{0, 1, 2, 16, 32, 48, 96, 128},
{0, 1, 2, 16, 32, 48, 96, 192},
{0, 1, 2, 16, 32, 48, 128, 192},
{0, 1, 2, 16, 32, 64, 96, 128},
{0, 1, 2, 16, 32, 64, 96, 192},
{0, 1, 2, 16, 32, 64, 128, 192},
{0, 1, 2, 16, 32, 96, 128, 192},
{0, 1, 2, 16, 48, 64, 96, 128},
{0, 1, 2, 16, 48, 64, 96, 192},
{0, 1, 2, 16, 48, 64, 128, 192},
{0, 1, 2, 16, 48, 96, 128, 192},
{0, 1, 2, 16, 64, 96, 128, 192},
{0, 1, 2, 32, 48, 64, 96, 128},
{0, 1, 2, 32, 48, 64, 96, 192},
{0, 1, 2, 32, 48, 64, 128, 192},
{0, 1, 2, 32, 48, 96, 128, 192},
{0, 1, 2, 32, 64, 96, 128, 192},
{0, 1, 2, 48, 64, 96, 128, 192},
{0, 1, 4, 8, 16, 32, 48, 64},
{0, 1, 4, 8, 16, 32, 48, 96},
{0, 1, 4, 8, 16, 32, 48, 128},
{0, 1, 4, 8, 16, 32, 48, 192},
{0, 1, 4, 8, 16, 32, 64, 96},
{0, 1, 4, 8, 16, 32, 64, 128},
{0, 1, 4, 8, 16, 32, 64, 192},
{0, 1, 4, 8, 16, 32, 96, 128},
{0, 1, 4, 8, 16, 32, 96, 192},
{0, 1, 4, 8, 16, 32, 128, 192},
{0, 1, 4, 8, 16, 48, 64, 96},
{0, 1, 4, 8, 16, 48, 64, 128},
{0, 1, 4, 8, 16, 48, 64, 192},
{0, 1, 4, 8, 16, 48, 96, 128},
{0, 1, 4, 8, 16, 48, 96, 192},

{0, 1, 4, 8, 16, 48, 128, 192},
{0, 1, 4, 8, 16, 64, 96, 128},
{0, 1, 4, 8, 16, 64, 96, 192},
{0, 1, 4, 8, 16, 64, 128, 192},
{0, 1, 4, 8, 16, 96, 128, 192},
{0, 1, 4, 8, 32, 48, 64, 96},
{0, 1, 4, 8, 32, 48, 64, 128},
{0, 1, 4, 8, 32, 48, 64, 192},
{0, 1, 4, 8, 32, 48, 96, 128},
{0, 1, 4, 8, 32, 48, 96, 192},
{0, 1, 4, 8, 32, 48, 128, 192},
{0, 1, 4, 8, 32, 64, 96, 128},
{0, 1, 4, 8, 32, 64, 96, 192},
{0, 1, 4, 8, 32, 64, 128, 192},
{0, 1, 4, 8, 32, 96, 128, 192},
{0, 1, 4, 8, 48, 64, 96, 128},
{0, 1, 4, 8, 48, 64, 96, 192},
{0, 1, 4, 8, 48, 64, 128, 192},
{0, 1, 4, 8, 48, 96, 128, 192},
{0, 1, 4, 8, 64, 96, 128, 192},
{0, 1, 4, 16, 32, 48, 64, 96},
{0, 1, 4, 16, 32, 48, 64, 128},
{0, 1, 4, 16, 32, 48, 64, 192},
{0, 1, 4, 16, 32, 48, 96, 128},
{0, 1, 4, 16, 32, 48, 96, 192},
{0, 1, 4, 16, 32, 48, 128, 192},
{0, 1, 4, 16, 32, 64, 96, 128},
{0, 1, 4, 16, 32, 64, 96, 192},
{0, 1, 4, 16, 32, 64, 128, 192},
{0, 1, 4, 16, 32, 96, 128, 192},
{0, 1, 4, 16, 48, 64, 96, 128},
{0, 1, 4, 16, 48, 64, 96, 192},
{0, 1, 4, 16, 48, 64, 128, 192},
{0, 1, 4, 16, 48, 96, 128, 192},
{0, 1, 4, 16, 64, 96, 128, 192},
{0, 1, 4, 32, 48, 64, 96, 128},
{0, 1, 4, 32, 48, 64, 96, 192},
{0, 1, 4, 32, 48, 64, 128, 192},
{0, 1, 4, 32, 48, 96, 128, 192},
{0, 1, 4, 32, 64, 96, 128, 192},
{0, 1, 4, 48, 64, 96, 128, 192},
{0, 1, 8, 16, 32, 48, 64, 96},
{0, 1, 8, 16, 32, 48, 64, 128},
{0, 1, 8, 16, 32, 48, 64, 192},
{0, 1, 8, 16, 32, 48, 96, 128},
{0, 1, 8, 16, 32, 48, 96, 192},
{0, 1, 8, 16, 32, 48, 128, 192},
{0, 1, 8, 16, 32, 64, 96, 128},
{0, 1, 8, 16, 32, 64, 96, 192},
{0, 1, 8, 16, 32, 64, 128, 192},
{0, 1, 8, 16, 32, 96, 128, 192},
{0, 1, 8, 16, 48, 64, 96, 128},
{0, 1, 8, 16, 48, 64, 96, 192},
{0, 1, 8, 16, 48, 64, 128, 192},
{0, 1, 8, 16, 48, 96, 128, 192},
{0, 1, 8, 16, 64, 96, 128, 192},
{0, 1, 8, 32, 48, 64, 96, 128},
{0, 1, 8, 32, 48, 64, 96, 192},
{0, 1, 8, 32, 48, 64, 128, 192},
{0, 1, 8, 32, 48, 96, 128, 192},
{0, 1, 8, 32, 64, 96, 128, 192},
{0, 1, 8, 48, 64, 96, 128, 192},
{0, 1, 16, 32, 48, 64, 96, 128},
{0, 1, 16, 32, 48, 64, 96, 192},
{0, 1, 16, 32, 48, 64, 128, 192},
{0, 1, 16, 32, 48, 96, 128, 192},
{0, 1, 16, 32, 64, 96, 128, 192},
{0, 1, 16, 48, 64, 96, 128, 192},
{0, 1, 32, 48, 64, 96, 128, 192},
{0, 2, 4, 8, 16, 32, 48, 64},
{0, 2, 4, 8, 16, 32, 48, 96},
{0, 2, 4, 8, 16, 32, 48, 128},
{0, 2, 4, 8, 16, 32, 48, 192},
{0, 2, 4, 8, 16, 32, 64, 96},
{0, 2, 4, 8, 16, 32, 64, 128},
{0, 2, 4, 8, 16, 32, 64, 192},
{0, 2, 4, 8, 16, 32, 96, 128},
{0, 2, 4, 8, 16, 32, 96, 192},
{0, 2, 4, 8, 16, 32, 128, 192},
{0, 2, 4, 8, 16, 48, 64, 96},
{0, 2, 4, 8, 16, 48, 64, 128},
{0, 2, 4, 8, 16, 48, 64, 192},
{0, 2, 4, 8, 16, 48, 96, 128},
{0, 2, 4, 8, 16, 48, 96, 192},
{0, 2, 4, 8, 16, 48, 128, 192},
{0, 2, 4, 8, 16, 64, 96, 128},
{0, 2, 4, 8, 16, 64, 96, 192},
{0, 2, 4, 8, 16, 64, 128, 192},
{0, 2, 4, 8, 16, 96, 128, 192},
{0, 2, 4, 8, 32, 48, 64, 96},
{0, 2, 4, 8, 32, 48, 64, 128},
{0, 2, 4, 8, 32, 48, 64, 192},
{0, 2, 4, 8, 32, 48, 96, 128},
{0, 2, 4, 8, 32, 48, 96, 192},
{0, 2, 4, 8, 32, 48, 128, 192},
{0, 2, 4, 8, 32, 64, 96, 128},
{0, 2, 4, 8, 32, 64, 96, 192},
{0, 2, 4, 8, 32, 64, 128, 192},
{0, 2, 4, 8, 32, 96, 128, 192},
{0, 2, 4, 8, 48, 64, 96, 128},
{0, 2, 4, 8, 48, 64, 96, 192},
{0, 2, 4, 8, 48, 64, 128, 192},
{0, 2, 4, 8, 48, 96, 128, 192},
{0, 2, 4, 8, 64, 96, 128, 192},
{0, 2, 4, 16, 32, 48, 64, 96},
{0, 2, 4, 16, 32, 48, 64, 128},
{0, 2, 4, 16, 32, 48, 64, 192},
{0, 2, 4, 16, 32, 48, 96, 128},
{0, 2, 4, 16, 32, 48, 96, 192},
{0, 2, 4, 16, 32, 48, 128, 192},
{0, 2, 4, 16, 32, 64, 96, 128},
{0, 2, 4, 16, 32, 64, 96, 192},
{0, 2, 4, 16, 32, 64, 128, 192},
{0, 2, 4, 16, 32, 96, 128, 192},
{0, 2, 4, 16, 48, 64, 96, 128},
{0, 2, 4, 16, 48, 64, 96, 192},
{0, 2, 4, 16, 48, 64, 128, 192},
{0, 2, 4, 16, 48, 96, 128, 192},
{0, 2, 4, 16, 64, 96, 128, 192},
{0, 2, 4, 32, 48, 64, 96, 128},
{0, 2, 4, 32, 48, 64, 96, 192},
{0, 2, 4, 32, 48, 64, 128, 192},
{0, 2, 4, 32, 48, 96, 128, 192},
{0, 2, 4, 32, 64, 96, 128, 192},
{0, 2, 4, 48, 64, 96, 128, 192},
{0, 2, 8, 16, 32, 48, 64, 96},
{0, 2, 8, 16, 32, 48, 64, 128},
{0, 2, 8, 16, 32, 48, 64, 192},
{0, 2, 8, 16, 32, 48, 96, 128},
{0, 2, 8, 16, 32, 48, 96, 192},
{0, 2, 8, 16, 32, 48, 128, 192},
{0, 2, 8, 16, 32, 64, 96, 128},
{0, 2, 8, 16, 32, 64, 96, 192},
{0, 2, 8, 16, 32, 64, 128, 192},

{0, 2, 8, 16, 32, 96, 128, 192},
{0, 2, 8, 16, 48, 64, 96, 128},
{0, 2, 8, 16, 48, 64, 96, 192},
{0, 2, 8, 16, 48, 64, 128, 192},
{0, 2, 8, 16, 48, 96, 128, 192},
{0, 2, 8, 16, 64, 96, 128, 192},
{0, 2, 8, 32, 48, 64, 96, 128},
{0, 2, 8, 32, 48, 64, 96, 192},
{0, 2, 8, 32, 48, 64, 128, 192},
{0, 2, 8, 32, 48, 96, 128, 192},
{0, 2, 8, 32, 64, 96, 128, 192},
{0, 2, 8, 48, 64, 96, 128, 192},
{0, 2, 16, 32, 48, 64, 96, 128},
{0, 2, 16, 32, 48, 64, 96, 192},
{0, 2, 16, 32, 48, 64, 128, 192},
{0, 2, 16, 32, 48, 96, 128, 192},
{0, 2, 16, 32, 64, 96, 128, 192},
{0, 2, 16, 48, 64, 96, 128, 192},
{0, 2, 32, 48, 64, 96, 128, 192},
{0, 4, 8, 16, 32, 48, 64, 96},
{0, 4, 8, 16, 32, 48, 64, 128},
{0, 4, 8, 16, 32, 48, 64, 192},
{0, 4, 8, 16, 32, 48, 96, 128},
{0, 4, 8, 16, 32, 48, 96, 192},
{0, 4, 8, 16, 32, 48, 128, 192},
{0, 4, 8, 16, 32, 64, 96, 128},
{0, 4, 8, 16, 32, 64, 96, 192},
{0, 4, 8, 16, 32, 64, 128, 192},
{0, 4, 8, 16, 32, 96, 128, 192},
{0, 4, 8, 16, 48, 64, 96, 128},
{0, 4, 8, 16, 48, 64, 96, 192},
{0, 4, 8, 16, 48, 64, 128, 192},
{0, 4, 8, 16, 48, 96, 128, 192},
{0, 4, 8, 16, 64, 96, 128, 192},
{0, 4, 8, 32, 48, 64, 96, 128},
{0, 4, 8, 32, 48, 64, 96, 192},
{0, 4, 8, 32, 48, 64, 128, 192},
{0, 4, 8, 32, 48, 96, 128, 192},
{0, 4, 8, 32, 64, 96, 128, 192},
{0, 4, 8, 48, 64, 96, 128, 192},
{0, 4, 16, 32, 48, 64, 96, 128},
{0, 4, 16, 32, 48, 64, 96, 192},
{0, 4, 16, 32, 48, 64, 128, 192},
{0, 4, 16, 32, 48, 96, 128, 192},
{0, 4, 16, 32, 64, 96, 128, 192},
{0, 4, 16, 48, 64, 96, 128, 192},
{0, 4, 32, 48, 64, 96, 128, 192},
{0, 8, 16, 32, 48, 64, 96, 128},
{0, 8, 16, 32, 48, 64, 96, 192},
{0, 8, 16, 32, 48, 64, 128, 192},
{0, 8, 16, 32, 48, 96, 128, 192},
{0, 8, 16, 32, 64, 96, 128, 192},
{0, 8, 16, 48, 64, 96, 128, 192},
{0, 8, 32, 48, 64, 96, 128, 192},
{0, 16, 32, 48, 64, 96, 128, 192},
{1, 2, 4, 8, 16, 32, 48, 64},
{1, 2, 4, 8, 16, 32, 48, 96},
{1, 2, 4, 8, 16, 32, 48, 128},
{1, 2, 4, 8, 16, 32, 48, 192},
{1, 2, 4, 8, 16, 32, 64, 96},
{1, 2, 4, 8, 16, 32, 64, 128},
{1, 2, 4, 8, 16, 32, 64, 192},
{1, 2, 4, 8, 16, 32, 96, 128},
{1, 2, 4, 8, 16, 32, 96, 192},
{1, 2, 4, 8, 16, 32, 128, 192},
{1, 2, 4, 8, 16, 48, 64, 96},
{1, 2, 4, 8, 16, 48, 64, 128},
{1, 2, 4, 8, 16, 48, 64, 192},
{1, 2, 4, 8, 16, 48, 96, 128},
{1, 2, 4, 8, 16, 48, 96, 192},
{1, 2, 4, 8, 16, 48, 128, 192},
{1, 2, 4, 8, 16, 64, 96, 128},
{1, 2, 4, 8, 16, 64, 96, 192},
{1, 2, 4, 8, 16, 64, 128, 192},
{1, 2, 4, 8, 16, 96, 128, 192},
{1, 2, 4, 8, 32, 48, 64, 96},
{1, 2, 4, 8, 32, 48, 64, 128},
{1, 2, 4, 8, 32, 48, 64, 192},
{1, 2, 4, 8, 32, 48, 96, 128},
{1, 2, 4, 8, 32, 48, 96, 192},
{1, 2, 4, 8, 32, 48, 128, 192},
{1, 2, 4, 8, 32, 64, 96, 128},
{1, 2, 4, 8, 32, 64, 96, 192},
{1, 2, 4, 8, 32, 64, 128, 192},
{1, 2, 4, 8, 32, 96, 128, 192},
{1, 2, 4, 8, 48, 64, 96, 128},
{1, 2, 4, 8, 48, 64, 96, 192},
{1, 2, 4, 8, 48, 64, 128, 192},
{1, 2, 4, 8, 48, 96, 128, 192},
{1, 2, 4, 8, 64, 96, 128, 192},
{1, 2, 4, 16, 32, 48, 64, 96},
{1, 2, 4, 16, 32, 48, 64, 128},
{1, 2, 4, 16, 32, 48, 64, 192},
{1, 2, 4, 16, 32, 48, 96, 128},
{1, 2, 4, 16, 32, 48, 96, 192},
{1, 2, 4, 16, 32, 48, 128, 192},
{1, 2, 4, 16, 32, 64, 96, 128},
{1, 2, 4, 16, 32, 64, 96, 192},
{1, 2, 4, 16, 32, 64, 128, 192},
{1, 2, 4, 16, 32, 96, 128, 192},
{1, 2, 4, 16, 48, 64, 96, 128},
{1, 2, 4, 16, 48, 64, 96, 192},
{1, 2, 4, 16, 48, 64, 128, 192},
{1, 2, 4, 16, 48, 96, 128, 192},
{1, 2, 4, 16, 64, 96, 128, 192},
{1, 2, 4, 32, 48, 64, 96, 128},
{1, 2, 4, 32, 48, 64, 96, 192},
{1, 2, 4, 32, 48, 64, 128, 192},
{1, 2, 4, 32, 48, 96, 128, 192},
{1, 2, 4, 32, 64, 96, 128, 192},
{1, 2, 4, 48, 64, 96, 128, 192},
{1, 2, 8, 16, 32, 48, 64, 96},
{1, 2, 8, 16, 32, 48, 64, 128},
{1, 2, 8, 16, 32, 48, 64, 192},
{1, 2, 8, 16, 32, 48, 96, 128},
{1, 2, 8, 16, 32, 48, 96, 192},
{1, 2, 8, 16, 32, 48, 128, 192},
{1, 2, 8, 16, 32, 64, 96, 128},
{1, 2, 8, 16, 32, 64, 96, 192},
{1, 2, 8, 16, 32, 64, 128, 192},
{1, 2, 8, 16, 32, 96, 128, 192},
{1, 2, 8, 16, 48, 64, 96, 128},
{1, 2, 8, 16, 48, 64, 96, 192},
{1, 2, 8, 16, 48, 64, 128, 192},
{1, 2, 8, 16, 48, 96, 128, 192},
{1, 2, 8, 16, 64, 96, 128, 192},
{1, 2, 8, 32, 48, 64, 96, 128},
{1, 2, 8, 32, 48, 64, 96, 192},
{1, 2, 8, 32, 48, 64, 128, 192},
{1, 2, 8, 32, 48, 96, 128, 192},
{1, 2, 8, 32, 64, 96, 128, 192},
{1, 2, 8, 48, 64, 96, 128, 192},
{1, 2, 16, 32, 48, 64, 96, 128},
{1, 2, 16, 32, 48, 64, 96, 192},

{1, 2, 16, 32, 48, 64, 128, 192},
{1, 2, 16, 32, 48, 96, 128, 192},
{1, 2, 16, 32, 64, 96, 128, 192},
{1, 2, 16, 48, 64, 96, 128, 192},
{1, 2, 32, 48, 64, 96, 128, 192},
{1, 4, 8, 16, 32, 48, 64, 96},
{1, 4, 8, 16, 32, 48, 64, 128},
{1, 4, 8, 16, 32, 48, 64, 192},
{1, 4, 8, 16, 32, 48, 96, 128},
{1, 4, 8, 16, 32, 48, 96, 192},
{1, 4, 8, 16, 32, 48, 128, 192},
{1, 4, 8, 16, 32, 64, 96, 128},
{1, 4, 8, 16, 32, 64, 96, 192},
{1, 4, 8, 16, 32, 64, 128, 192},
{1, 4, 8, 16, 32, 96, 128, 192},
{1, 4, 8, 16, 48, 64, 96, 128},
{1, 4, 8, 16, 48, 64, 96, 192},
{1, 4, 8, 16, 48, 64, 128, 192},
{1, 4, 8, 16, 48, 96, 128, 192},
{1, 4, 8, 16, 64, 96, 128, 192},
{1, 4, 8, 32, 48, 64, 96, 128},
{1, 4, 8, 32, 48, 64, 96, 192},
{1, 4, 8, 32, 48, 64, 128, 192},
{1, 4, 8, 32, 48, 96, 128, 192},
{1, 4, 8, 32, 64, 96, 128, 192},
{1, 4, 8, 48, 64, 96, 128, 192},
{1, 4, 16, 32, 48, 64, 96, 128},
{1, 4, 16, 32, 48, 64, 96, 192},
{1, 4, 16, 32, 48, 64, 128, 192},
{1, 4, 16, 32, 48, 96, 128, 192},
{1, 4, 16, 32, 64, 96, 128, 192},
{1, 4, 16, 48, 64, 96, 128, 192},
{1, 4, 32, 48, 64, 96, 128, 192},
{1, 8, 16, 32, 48, 64, 96, 128},
{1, 8, 16, 32, 48, 64, 96, 192},
{1, 8, 16, 32, 48, 64, 128, 192},
{1, 8, 16, 32, 48, 96, 128, 192},
{1, 8, 16, 32, 64, 96, 128, 192},
{1, 8, 16, 48, 64, 96, 128, 192},
{1, 8, 32, 48, 64, 96, 128, 192},
{1, 16, 32, 48, 64, 96, 128, 192},
{2, 4, 8, 16, 32, 48, 64, 96},
{2, 4, 8, 16, 32, 48, 64, 128},
{2, 4, 8, 16, 32, 48, 64, 192},
{2, 4, 8, 16, 32, 48, 96, 128},
{2, 4, 8, 16, 32, 48, 96, 192},
{2, 4, 8, 16, 32, 48, 128, 192},
{2, 4, 8, 16, 32, 64, 96, 128},
{2, 4, 8, 16, 32, 64, 96, 192},
{2, 4, 8, 16, 32, 64, 128, 192},
{2, 4, 8, 16, 32, 96, 128, 192},
{2, 4, 8, 16, 48, 64, 96, 128},
{2, 4, 8, 16, 48, 64, 96, 192},
{2, 4, 8, 16, 48, 64, 128, 192},
{2, 4, 8, 16, 48, 96, 128, 192},
{2, 4, 8, 16, 64, 96, 128, 192},
{2, 4, 8, 32, 48, 64, 96, 128},
{2, 4, 8, 32, 48, 64, 96, 192},
{2, 4, 8, 32, 48, 64, 128, 192},
{2, 4, 8, 32, 48, 96, 128, 192},
{2, 4, 8, 32, 64, 96, 128, 192},
{2, 4, 8, 48, 64, 96, 128, 192},
{2, 4, 16, 32, 48, 64, 96, 128},
{2, 4, 16, 32, 48, 64, 96, 192},
{2, 4, 16, 32, 48, 64, 128, 192},
{2, 4, 16, 32, 48, 96, 128, 192},
{2, 4, 16, 32, 64, 96, 128, 192},
{2, 4, 16, 48, 64, 96, 128, 192},
{2, 4, 32, 48, 64, 96, 128, 192},
{2, 8, 16, 32, 48, 64, 96, 128},
{2, 8, 16, 32, 48, 64, 96, 192},
{2, 8, 16, 32, 48, 64, 128, 192},
{2, 8, 16, 32, 48, 96, 128, 192},
{2, 8, 16, 32, 64, 96, 128, 192},
{2, 8, 16, 48, 64, 96, 128, 192},
{2, 8, 32, 48, 64, 96, 128, 192},
{2, 16, 32, 48, 64, 96, 128, 192},
{4, 8, 16, 32, 48, 64, 96, 128},
{4, 8, 16, 32, 48, 64, 96, 192},
{4, 8, 16, 32, 48, 64, 128, 192},
{4, 8, 16, 32, 48, 96, 128, 192},
{4, 8, 16, 32, 64, 96, 128, 192},
{4, 8, 16, 48, 64, 96, 128, 192},
{4, 8, 32, 48, 64, 96, 128, 192},
{4, 16, 32, 48, 64, 96, 128, 192},
{8, 16, 32, 48, 64, 96, 128, 192}.

In the case that the offset indicated by the offset indicating information is in units of radio frames, the NPRACH resource may be configured as follows:

As an example, in the TDD mode, the NPRACH resource may be configured on a second subframe in a radio frame for transmission.

As an example, in the TDD mode, the NPRACH resource may be configured on a seventh subframe in a radio frame for transmission.

As an example, in the TDD mode, the NPRACH resource may be configured on a second subframe or a seventh subframe in a radio frame for transmission.

Figure 2:
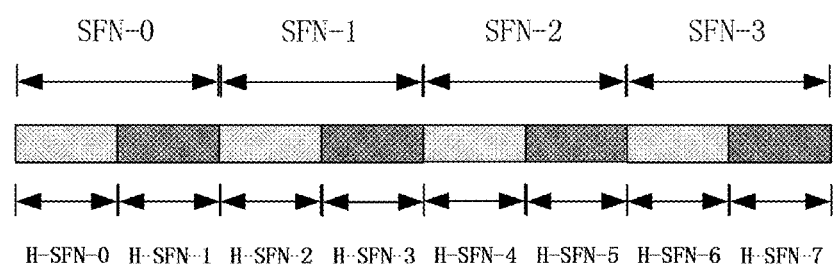
FIG. 2 schematically shows an example of an NPRACH time-domain resource indication based on a granularity of half radio frames.

As an example, the offset indicating information indicates an offset of the NPRACH resource within the period, where the indicated offset may be in units of half radio frames. FIG. 2 schematically shows an example of an NPRACH time-domain resource indication based on a granularity of half radio frames. In the example shown in FIG. 2, the configured period may be four radio frames, and the offset may be in units of half radio frames, for example, may be 0, 1, 2, 4, and so on.

As an example, in the TDD mode, the NPRACH resource may be configured on a second subframe in a half radio frame for transmission.

Specifically, the offset indicated by the offset indicating information may be selected from any of the following sets, where elements in the set may be in units of half radio frames:

{0, 1, 2, 4, 8, 16, 32, 64},
{0, 1, 2, 4, 8, 16, 32, 96},
{0, 1, 2, 4, 8, 16, 32, 128},
{0, 1, 2, 4, 8, 16, 32, 192},
{0, 1, 2, 4, 8, 16, 32, 256},
{0, 1, 2, 4, 8, 16, 64, 96},
{0, 1, 2, 4, 8, 16, 64, 128},
{0, 1, 2, 4, 8, 16, 64, 192},
{0, 1, 2, 4, 8, 16, 64, 256},
{0, 1, 2, 4, 8, 16, 96, 128},
{0, 1, 2, 4, 8, 16, 96, 192},
{0, 1, 2, 4, 8, 16, 96, 256},
{0, 1, 2, 4, 8, 16, 128, 192},
{0, 1, 2, 4, 8, 16, 128, 256},
{0, 1, 2, 4, 8, 16, 192, 256},
{0, 1, 2, 4, 8, 32, 64, 96},
{0, 1, 2, 4, 8, 32, 64, 128},
{0, 1, 2, 4, 8, 32, 64, 192},
{0, 1, 2, 4, 8, 32, 64, 256},
{0, 1, 2, 4, 8, 32, 96, 128},

{0, 1, 2, 4, 8, 32, 96, 192},
{0, 1, 2, 4, 8, 32, 96, 256},
{0, 1, 2, 4, 8, 32, 128, 192},
{0, 1, 2, 4, 8, 32, 128, 256},
{0, 1, 2, 4, 8, 32, 192, 256},
{0, 1, 2, 4, 8, 64, 96, 128},
{0, 1, 2, 4, 8, 64, 96, 192},
{0, 1, 2, 4, 8, 64, 96, 256},
{0, 1, 2, 4, 8, 64, 128, 192},
{0, 1, 2, 4, 8, 64, 128, 256},
{0, 1, 2, 4, 8, 64, 192, 256},
{0, 1, 2, 4, 8, 96, 128, 192},
{0, 1, 2, 4, 8, 96, 128, 256},
{0, 1, 2, 4, 8, 96, 192, 256},
{0, 1, 2, 4, 8, 128, 192, 256},
{0, 1, 2, 4, 16, 32, 64, 96},
{0, 1, 2, 4, 16, 32, 64, 128},
{0, 1, 2, 4, 16, 32, 64, 192},
{0, 1, 2, 4, 16, 32, 64, 256},
{0, 1, 2, 4, 16, 32, 96, 128},
{0, 1, 2, 4, 16, 32, 96, 192},
{0, 1, 2, 4, 16, 32, 96, 256},
{0, 1, 2, 4, 16, 32, 128, 192},
{0, 1, 2, 4, 16, 32, 128, 256},
{0, 1, 2, 4, 16, 32, 192, 256},
{0, 1, 2, 4, 16, 64, 96, 128},
{0, 1, 2, 4, 16, 64, 96, 192},
{0, 1, 2, 4, 16, 64, 96, 256},
{0, 1, 2, 4, 16, 64, 128, 192},
{0, 1, 2, 4, 16, 64, 128, 256},
{0, 1, 2, 4, 16, 64, 192, 256},
{0, 1, 2, 4, 16, 96, 128, 192},
{0, 1, 2, 4, 16, 96, 128, 256},
{0, 1, 2, 4, 16, 96, 192, 256},
{0, 1, 2, 4, 16, 128, 192, 256},
{0, 1, 2, 4, 32, 64, 96, 128},
{0, 1, 2, 4, 32, 64, 96, 192},
{0, 1, 2, 4, 32, 64, 96, 256},
{0, 1, 2, 4, 32, 64, 128, 192},
{0, 1, 2, 4, 32, 64, 128, 256},
{0, 1, 2, 4, 32, 64, 192, 256},
{0, 1, 2, 4, 32, 96, 128, 192},
{0, 1, 2, 4, 32, 96, 128, 256},
{0, 1, 2, 4, 32, 96, 192, 256},
{0, 1, 2, 4, 32, 128, 192, 256},
{0, 1, 2, 4, 64, 96, 128, 192},
{0, 1, 2, 4, 64, 96, 128, 256},
{0, 1, 2, 4, 64, 96, 192, 256},
{0, 1, 2, 4, 64, 128, 192, 256},
{0, 1, 2, 4, 96, 128, 192, 256},
{0, 1, 2, 8, 16, 32, 64, 96},
{0, 1, 2, 8, 16, 32, 64, 128},
{0, 1, 2, 8, 16, 32, 64, 192},
{0, 1, 2, 8, 16, 32, 64, 256},
{0, 1, 2, 8, 16, 32, 96, 128},
{0, 1, 2, 8, 16, 32, 96, 192},
{0, 1, 2, 8, 16, 32, 96, 256},
{0, 1, 2, 8, 16, 32, 128, 192},
{0, 1, 2, 8, 16, 32, 128, 256},
{0, 1, 2, 8, 16, 32, 192, 256},
{0, 1, 2, 8, 16, 64, 96, 128},
{0, 1, 2, 8, 16, 64, 96, 192},
{0, 1, 2, 8, 16, 64, 96, 256},
{0, 1, 2, 8, 16, 64, 128, 192},
{0, 1, 2, 8, 16, 64, 128, 256},
{0, 1, 2, 8, 16, 64, 192, 256},
{0, 1, 2, 8, 16, 96, 128, 192},
{0, 1, 2, 8, 16, 96, 128, 256},
{0, 1, 2, 8, 16, 96, 192, 256},
{0, 1, 2, 8, 16, 128, 192, 256},
{0, 1, 2, 8, 32, 64, 96, 128},
{0, 1, 2, 8, 32, 64, 96, 192},
{0, 1, 2, 8, 32, 64, 96, 256},
{0, 1, 2, 8, 32, 64, 128, 192},
{0, 1, 2, 8, 32, 64, 128, 256},
{0, 1, 2, 8, 32, 64, 192, 256},
{0, 1, 2, 8, 32, 96, 128, 192},
{0, 1, 2, 8, 32, 96, 128, 256},
{0, 1, 2, 8, 32, 96, 192, 256},
{0, 1, 2, 8, 32, 128, 192, 256},
{0, 1, 2, 8, 64, 96, 128, 192},
{0, 1, 2, 8, 64, 96, 128, 256},
{0, 1, 2, 8, 64, 96, 192, 256},
{0, 1, 2, 8, 64, 128, 192, 256},
{0, 1, 2, 8, 96, 128, 192, 256},
{0, 1, 2, 16, 32, 64, 96, 128},
{0, 1, 2, 16, 32, 64, 96, 192},
{0, 1, 2, 16, 32, 64, 96, 256},
{0, 1, 2, 16, 32, 64, 128, 192},
{0, 1, 2, 16, 32, 64, 128, 256},
{0, 1, 2, 16, 32, 64, 192, 256},
{0, 1, 2, 16, 32, 96, 128, 192},
{0, 1, 2, 16, 32, 96, 128, 256},
{0, 1, 2, 16, 32, 96, 192, 256},
{0, 1, 2, 16, 32, 128, 192, 256},
{0, 1, 2, 16, 64, 96, 128, 192},
{0, 1, 2, 16, 64, 96, 128, 256},
{0, 1, 2, 16, 64, 96, 192, 256},
{0, 1, 2, 16, 64, 128, 192, 256},
{0, 1, 2, 16, 96, 128, 192, 256},
{0, 1, 2, 32, 64, 96, 128, 192},
{0, 1, 2, 32, 64, 96, 128, 256},
{0, 1, 2, 32, 64, 96, 192, 256},
{0, 1, 2, 32, 64, 128, 192, 256},
{0, 1, 2, 32, 96, 128, 192, 256},
{0, 1, 2, 64, 96, 128, 192, 256},
{0, 1, 4, 8, 16, 32, 64, 96},
{0, 1, 4, 8, 16, 32, 64, 128},
{0, 1, 4, 8, 16, 32, 64, 192},
{0, 1, 4, 8, 16, 32, 64, 256},
{0, 1, 4, 8, 16, 32, 96, 128},
{0, 1, 4, 8, 16, 32, 96, 192},
{0, 1, 4, 8, 16, 32, 96, 256},
{0, 1, 4, 8, 16, 32, 128, 192},
{0, 1, 4, 8, 16, 32, 128, 256},
{0, 1, 4, 8, 16, 32, 192, 256},
{0, 1, 4, 8, 16, 64, 96, 128},
{0, 1, 4, 8, 16, 64, 96, 192},
{0, 1, 4, 8, 16, 64, 96, 256},
{0, 1, 4, 8, 16, 64, 128, 192},
{0, 1, 4, 8, 16, 64, 128, 256},
{0, 1, 4, 8, 16, 64, 192, 256},
{0, 1, 4, 8, 16, 96, 128, 192},
{0, 1, 4, 8, 16, 96, 128, 256},
{0, 1, 4, 8, 16, 96, 192, 256},
{0, 1, 4, 8, 16, 128, 192, 256},
{0, 1, 4, 8, 32, 64, 96, 128},
{0, 1, 4, 8, 32, 64, 96, 192},
{0, 1, 4, 8, 32, 64, 96, 256},
{0, 1, 4, 8, 32, 64, 128, 192},
{0, 1, 4, 8, 32, 64, 128, 256},
{0, 1, 4, 8, 32, 64, 192, 256},
{0, 1, 4, 8, 32, 96, 128, 192},
{0, 1, 4, 8, 32, 96, 128, 256},

{0, 1, 4, 8, 32, 96, 192, 256},
{0, 1, 4, 8, 32, 128, 192, 256},
{0, 1, 4, 8, 64, 96, 128, 192},
{0, 1, 4, 8, 64, 96, 128, 256},
{0, 1, 4, 8, 64, 96, 192, 256},
{0, 1, 4, 8, 64, 128, 192, 256},
{0, 1, 4, 8, 96, 128, 192, 256},
{0, 1, 4, 16, 32, 64, 96, 128},
{0, 1, 4, 16, 32, 64, 96, 192},
{0, 1, 4, 16, 32, 64, 96, 256},
{0, 1, 4, 16, 32, 64, 128, 192},
{0, 1, 4, 16, 32, 64, 128, 256},
{0, 1, 4, 16, 32, 64, 192, 256},
{0, 1, 4, 16, 32, 96, 128, 192},
{0, 1, 4, 16, 32, 96, 128, 256},
{0, 1, 4, 16, 32, 96, 192, 256},
{0, 1, 4, 16, 32, 128, 192, 256},
{0, 1, 4, 16, 64, 96, 128, 192},
{0, 1, 4, 16, 64, 96, 128, 256},
{0, 1, 4, 16, 64, 96, 192, 256},
{0, 1, 4, 16, 64, 128, 192, 256},
{0, 1, 4, 16, 96, 128, 192, 256},
{0, 1, 4, 32, 64, 96, 128, 192},
{0, 1, 4, 32, 64, 96, 128, 256},
{0, 1, 4, 32, 64, 96, 192, 256},
{0, 1, 4, 32, 64, 128, 192, 256},
{0, 1, 4, 32, 96, 128, 192, 256},
{0, 1, 4, 64, 96, 128, 192, 256},
{0, 1, 8, 16, 32, 64, 96, 128},
{0, 1, 8, 16, 32, 64, 96, 192},
{0, 1, 8, 16, 32, 64, 96, 256},
{0, 1, 8, 16, 32, 64, 128, 192},
{0, 1, 8, 16, 32, 64, 128, 256},
{0, 1, 8, 16, 32, 64, 192, 256},
{0, 1, 8, 16, 32, 96, 128, 192},
{0, 1, 8, 16, 32, 96, 128, 256},
{0, 1, 8, 16, 32, 96, 192, 256},
{0, 1, 8, 16, 32, 128, 192, 256},
{0, 1, 8, 16, 64, 96, 128, 192},
{0, 1, 8, 16, 64, 96, 128, 256},
{0, 1, 8, 16, 64, 96, 192, 256},
{0, 1, 8, 16, 64, 128, 192, 256},
{0, 1, 8, 16, 96, 128, 192, 256},
{0, 1, 8, 32, 64, 96, 128, 192},
{0, 1, 8, 32, 64, 96, 128, 256},
{0, 1, 8, 32, 64, 96, 192, 256},
{0, 1, 8, 32, 64, 128, 192, 256},
{0, 1, 8, 32, 96, 128, 192, 256},
{0, 1, 8, 64, 96, 128, 192, 256},
{0, 1, 16, 32, 64, 96, 128, 192},
{0, 1, 16, 32, 64, 96, 128, 256},
{0, 1, 16, 32, 64, 96, 192, 256},
{0, 1, 16, 32, 64, 128, 192, 256},
{0, 1, 16, 32, 96, 128, 192, 256},
{0, 1, 16, 64, 96, 128, 192, 256},
{0, 1, 32, 64, 96, 128, 192, 256},
{0, 2, 4, 8, 16, 32, 64, 96},
{0, 2, 4, 8, 16, 32, 64, 128},
{0, 2, 4, 8, 16, 32, 64, 192},
{0, 2, 4, 8, 16, 32, 64, 256},
{0, 2, 4, 8, 16, 32, 96, 128},
{0, 2, 4, 8, 16, 32, 96, 192},
{0, 2, 4, 8, 16, 32, 96, 256},
{0, 2, 4, 8, 16, 32, 128, 192},
{0, 2, 4, 8, 16, 32, 128, 256},
{0, 2, 4, 8, 16, 32, 192, 256},
{0, 2, 4, 8, 16, 64, 96, 128},
{0, 2, 4, 8, 16, 64, 96, 192},
{0, 2, 4, 8, 16, 64, 96, 256},
{0, 2, 4, 8, 16, 64, 128, 192},
{0, 2, 4, 8, 16, 64, 128, 256},
{0, 2, 4, 8, 16, 64, 192, 256},
{0, 2, 4, 8, 16, 96, 128, 192},
{0, 2, 4, 8, 16, 96, 128, 256},
{0, 2, 4, 8, 16, 96, 192, 256},
{0, 2, 4, 8, 16, 128, 192, 256},
{0, 2, 4, 8, 32, 64, 96, 128},
{0, 2, 4, 8, 32, 64, 96, 192},
{0, 2, 4, 8, 32, 64, 96, 256},
{0, 2, 4, 8, 32, 64, 128, 192},
{0, 2, 4, 8, 32, 64, 128, 256},
{0, 2, 4, 8, 32, 64, 192, 256},
{0, 2, 4, 8, 32, 96, 128, 192},
{0, 2, 4, 8, 32, 96, 128, 256},
{0, 2, 4, 8, 32, 96, 192, 256},
{0, 2, 4, 8, 32, 128, 192, 256},
{0, 2, 4, 8, 64, 96, 128, 192},
{0, 2, 4, 8, 64, 96, 128, 256},
{0, 2, 4, 8, 64, 96, 192, 256},
{0, 2, 4, 8, 64, 128, 192, 256},
{0, 2, 4, 8, 96, 128, 192, 256},
{0, 2, 4, 16, 32, 64, 96, 128},
{0, 2, 4, 16, 32, 64, 96, 192},
{0, 2, 4, 16, 32, 64, 96, 256},
{0, 2, 4, 16, 32, 64, 128, 192},
{0, 2, 4, 16, 32, 64, 128, 256},
{0, 2, 4, 16, 32, 64, 192, 256},
{0, 2, 4, 16, 32, 96, 128, 192},
{0, 2, 4, 16, 32, 96, 128, 256},
{0, 2, 4, 16, 32, 96, 192, 256},
{0, 2, 4, 16, 32, 128, 192, 256},
{0, 2, 4, 16, 64, 96, 128, 192},
{0, 2, 4, 16, 64, 96, 128, 256},
{0, 2, 4, 16, 64, 96, 192, 256},
{0, 2, 4, 16, 64, 128, 192, 256},
{0, 2, 4, 16, 96, 128, 192, 256},
{0, 2, 4, 32, 64, 96, 128, 192},
{0, 2, 4, 32, 64, 96, 128, 256},
{0, 2, 4, 32, 64, 96, 192, 256},
{0, 2, 4, 32, 64, 128, 192, 256},
{0, 2, 4, 32, 96, 128, 192, 256},
{0, 2, 4, 64, 96, 128, 192, 256},
{0, 2, 8, 16, 32, 64, 96, 128},
{0, 2, 8, 16, 32, 64, 96, 192},
{0, 2, 8, 16, 32, 64, 96, 256},
{0, 2, 8, 16, 32, 64, 128, 192},
{0, 2, 8, 16, 32, 64, 128, 256},
{0, 2, 8, 16, 32, 64, 192, 256},
{0, 2, 8, 16, 32, 96, 128, 192},
{0, 2, 8, 16, 32, 96, 128, 256},
{0, 2, 8, 16, 32, 96, 192, 256},
{0, 2, 8, 16, 32, 128, 192, 256},
{0, 2, 8, 16, 64, 96, 128, 192},
{0, 2, 8, 16, 64, 96, 128, 256},
{0, 2, 8, 16, 64, 96, 192, 256},
{0, 2, 8, 16, 64, 128, 192, 256},
{0, 2, 8, 16, 96, 128, 192, 256},
{0, 2, 8, 32, 64, 96, 128, 192},
{0, 2, 8, 32, 64, 96, 128, 256},
{0, 2, 8, 32, 64, 96, 192, 256},
{0, 2, 8, 32, 64, 128, 192, 256},
{0, 2, 8, 32, 96, 128, 192, 256},
{0, 2, 8, 64, 96, 128, 192, 256},
{0, 2, 16, 32, 64, 96, 128, 192},

{0, 2, 16, 32, 64, 96, 128, 256},
{0, 2, 16, 32, 64, 96, 192, 256},
{0, 2, 16, 32, 64, 128, 192, 256},
{0, 2, 16, 32, 96, 128, 192, 256},
{0, 2, 16, 64, 96, 128, 192, 256},
{0, 2, 32, 64, 96, 128, 192, 256},
{0, 4, 8, 16, 32, 64, 96, 128},
{0, 4, 8, 16, 32, 64, 96, 192},
{0, 4, 8, 16, 32, 64, 96, 256},
{0, 4, 8, 16, 32, 64, 128, 192},
{0, 4, 8, 16, 32, 64, 128, 256},
{0, 4, 8, 16, 32, 64, 192, 256},
{0, 4, 8, 16, 32, 96, 128, 192},
{0, 4, 8, 16, 32, 96, 128, 256},
{0, 4, 8, 16, 32, 96, 192, 256},
{0, 4, 8, 16, 32, 128, 192, 256},
{0, 4, 8, 16, 64, 96, 128, 192},
{0, 4, 8, 16, 64, 96, 128, 256},
{0, 4, 8, 16, 64, 96, 192, 256},
{0, 4, 8, 16, 64, 128, 192, 256},
{0, 4, 8, 16, 96, 128, 192, 256},
{0, 4, 8, 32, 64, 96, 128, 192},
{0, 4, 8, 32, 64, 96, 128, 256},
{0, 4, 8, 32, 64, 96, 192, 256},
{0, 4, 8, 32, 64, 128, 192, 256},
{0, 4, 8, 32, 96, 128, 192, 256},
{0, 4, 8, 64, 96, 128, 192, 256},
{0, 4, 16, 32, 64, 96, 128, 192},
{0, 4, 16, 32, 64, 96, 128, 256},
{0, 4, 16, 32, 64, 96, 192, 256},
{0, 4, 16, 32, 64, 128, 192, 256},
{0, 4, 16, 32, 96, 128, 192, 256},
{0, 4, 16, 64, 96, 128, 192, 256},
{0, 4, 32, 64, 96, 128, 192, 256},
{0, 8, 16, 32, 64, 96, 128, 192},
{0, 8, 16, 32, 64, 96, 128, 256},
{0, 8, 16, 32, 64, 96, 192, 256},
{0, 8, 16, 32, 64, 128, 192, 256},
{0, 8, 16, 32, 96, 128, 192, 256},
{0, 8, 16, 64, 96, 128, 192, 256},
{0, 8, 32, 64, 96, 128, 192, 256},
{0, 16, 32, 64, 96, 128, 192, 256},
{1, 2, 4, 8, 16, 32, 64, 96},
{1, 2, 4, 8, 16, 32, 64, 128},
{1, 2, 4, 8, 16, 32, 64, 192},
{1, 2, 4, 8, 16, 32, 64, 256},
{1, 2, 4, 8, 16, 32, 96, 128},
{1, 2, 4, 8, 16, 32, 96, 192},
{1, 2, 4, 8, 16, 32, 96, 256},
{1, 2, 4, 8, 16, 32, 128, 192},
{1, 2, 4, 8, 16, 32, 128, 256},
{1, 2, 4, 8, 16, 32, 192, 256},
{1, 2, 4, 8, 16, 64, 96, 128},
{1, 2, 4, 8, 16, 64, 96, 192},
{1, 2, 4, 8, 16, 64, 96, 256},
{1, 2, 4, 8, 16, 64, 128, 192},
{1, 2, 4, 8, 16, 64, 128, 256},
{1, 2, 4, 8, 16, 64, 192, 256},
{1, 2, 4, 8, 16, 96, 128, 192},
{1, 2, 4, 8, 16, 96, 128, 256},
{1, 2, 4, 8, 16, 96, 192, 256},
{1, 2, 4, 8, 16, 128, 192, 256},
{1, 2, 4, 8, 32, 64, 96, 128},
{1, 2, 4, 8, 32, 64, 96, 192},
{1, 2, 4, 8, 32, 64, 96, 256},
{1, 2, 4, 8, 32, 64, 128, 192},
{1, 2, 4, 8, 32, 64, 128, 256},
{1, 2, 4, 8, 32, 64, 192, 256},
{1, 2, 4, 8, 32, 96, 128, 192},
{1, 2, 4, 8, 32, 96, 128, 256},
{1, 2, 4, 8, 32, 96, 192, 256},
{1, 2, 4, 8, 32, 128, 192, 256},
{1, 2, 4, 8, 64, 96, 128, 192},
{1, 2, 4, 8, 64, 96, 128, 256},
{1, 2, 4, 8, 64, 96, 192, 256},
{1, 2, 4, 8, 64, 128, 192, 256},
{1, 2, 4, 8, 96, 128, 192, 256},
{1, 2, 4, 16, 32, 64, 96, 128},
{1, 2, 4, 16, 32, 64, 96, 192},
{1, 2, 4, 16, 32, 64, 96, 256},
{1, 2, 4, 16, 32, 64, 128, 192},
{1, 2, 4, 16, 32, 64, 128, 256},
{1, 2, 4, 16, 32, 64, 192, 256},
{1, 2, 4, 16, 32, 96, 128, 192},
{1, 2, 4, 16, 32, 96, 128, 256},
{1, 2, 4, 16, 32, 96, 192, 256},
{1, 2, 4, 16, 32, 128, 192, 256},
{1, 2, 4, 16, 64, 96, 128, 192},
{1, 2, 4, 16, 64, 96, 128, 256},
{1, 2, 4, 16, 64, 96, 192, 256},
{1, 2, 4, 16, 64, 128, 192, 256},
{1, 2, 4, 16, 96, 128, 192, 256},
{1, 2, 4, 32, 64, 96, 128, 192},
{1, 2, 4, 32, 64, 96, 128, 256},
{1, 2, 4, 32, 64, 96, 192, 256},
{1, 2, 4, 32, 64, 128, 192, 256},
{1, 2, 4, 32, 96, 128, 192, 256},
{1, 2, 4, 64, 96, 128, 192, 256},
{1, 2, 8, 16, 32, 64, 96, 128},
{1, 2, 8, 16, 32, 64, 96, 192},
{1, 2, 8, 16, 32, 64, 96, 256},
{1, 2, 8, 16, 32, 64, 128, 192},
{1, 2, 8, 16, 32, 64, 128, 256},
{1, 2, 8, 16, 32, 64, 192, 256},
{1, 2, 8, 16, 32, 96, 128, 192},
{1, 2, 8, 16, 32, 96, 128, 256},
{1, 2, 8, 16, 32, 96, 192, 256},
{1, 2, 8, 16, 32, 128, 192, 256},
{1, 2, 8, 16, 64, 96, 128, 192},
{1, 2, 8, 16, 64, 96, 128, 256},
{1, 2, 8, 16, 64, 96, 192, 256},
{1, 2, 8, 16, 64, 128, 192, 256},
{1, 2, 8, 16, 96, 128, 192, 256},
{1, 2, 8, 32, 64, 96, 128, 192},
{1, 2, 8, 32, 64, 96, 128, 256},
{1, 2, 8, 32, 64, 96, 192, 256},
{1, 2, 8, 32, 64, 128, 192, 256},
{1, 2, 8, 32, 96, 128, 192, 256},
{1, 2, 8, 64, 96, 128, 192, 256},
{1, 2, 16, 32, 64, 96, 128, 192},
{1, 2, 16, 32, 64, 96, 128, 256},
{1, 2, 16, 32, 64, 96, 192, 256},
{1, 2, 16, 32, 64, 128, 192, 256},
{1, 2, 16, 32, 96, 128, 192, 256},
{1, 2, 16, 64, 96, 128, 192, 256},
{1, 2, 32, 64, 96, 128, 192, 256},
{1, 4, 8, 16, 32, 64, 96, 128},
{1, 4, 8, 16, 32, 64, 96, 192},
{1, 4, 8, 16, 32, 64, 96, 256},
{1, 4, 8, 16, 32, 64, 128, 192},
{1, 4, 8, 16, 32, 64, 128, 256},
{1, 4, 8, 16, 32, 64, 192, 256},
{1, 4, 8, 16, 32, 96, 128, 192},
{1, 4, 8, 16, 32, 96, 128, 256},

{1, 4, 8, 16, 32, 96, 192, 256},
{1, 4, 8, 16, 32, 128, 192, 256},
{1, 4, 8, 16, 64, 96, 128, 192},
{1, 4, 8, 16, 64, 96, 128, 256},
{1, 4, 8, 16, 64, 96, 192, 256},
{1, 4, 8, 16, 64, 128, 192, 256},
{1, 4, 8, 16, 96, 128, 192, 256},
{1, 4, 8, 32, 64, 96, 128, 192},
{1, 4, 8, 32, 64, 96, 128, 256},
{1, 4, 8, 32, 64, 96, 192, 256},
{1, 4, 8, 32, 64, 128, 192, 256},
{1, 4, 8, 32, 96, 128, 192, 256},
{1, 4, 8, 64, 96, 128, 192, 256},
{1, 4, 16, 32, 64, 96, 128, 192},
{1, 4, 16, 32, 64, 96, 128, 256},
{1, 4, 16, 32, 64, 96, 192, 256},
{1, 4, 16, 32, 64, 128, 192, 256},
{1, 4, 16, 32, 96, 128, 192, 256},
{1, 4, 16, 64, 96, 128, 192, 256},
{1, 4, 32, 64, 96, 128, 192, 256},
{1, 8, 16, 32, 64, 96, 128, 192},
{1, 8, 16, 32, 64, 96, 128, 256},
{1, 8, 16, 32, 64, 96, 192, 256},
{1, 8, 16, 32, 64, 128, 192, 256},
{1, 8, 16, 32, 96, 128, 192, 256},
{1, 8, 16, 64, 96, 128, 192, 256},
{1, 8, 32, 64, 96, 128, 192, 256},
{1, 16, 32, 64, 96, 128, 192, 256},
{2, 4, 8, 16, 32, 64, 96, 128},
{2, 4, 8, 16, 32, 64, 96, 192},
{2, 4, 8, 16, 32, 64, 96, 256},
{2, 4, 8, 16, 32, 64, 128, 192},
{2, 4, 8, 16, 32, 64, 128, 256},
{2, 4, 8, 16, 32, 64, 192, 256},
{2, 4, 8, 16, 32, 96, 128, 192},
{2, 4, 8, 16, 32, 96, 128, 256},
{2, 4, 8, 16, 32, 96, 192, 256},
{2, 4, 8, 16, 32, 128, 192, 256},
{2, 4, 8, 16, 64, 96, 128, 192},
{2, 4, 8, 16, 64, 96, 128, 256},
{2, 4, 8, 16, 64, 96, 192, 256},
{2, 4, 8, 16, 64, 128, 192, 256},
{2, 4, 8, 16, 96, 128, 192, 256},
{2, 4, 8, 32, 64, 96, 128, 192},
{2, 4, 8, 32, 64, 96, 128, 256},
{2, 4, 8, 32, 64, 96, 192, 256},
{2, 4, 8, 32, 64, 128, 192, 256},
{2, 4, 8, 32, 96, 128, 192, 256},
{2, 4, 8, 64, 96, 128, 192, 256},
{2, 4, 16, 32, 64, 96, 128, 192},
{2, 4, 16, 32, 64, 96, 128, 256},
{2, 4, 16, 32, 64, 96, 192, 256},
{2, 4, 16, 32, 64, 128, 192, 256},
{2, 4, 16, 32, 96, 128, 192, 256},
{2, 4, 16, 64, 96, 128, 192, 256},
{2, 4, 32, 64, 96, 128, 192, 256},
{2, 8, 16, 32, 64, 96, 128, 192},
{2, 8, 16, 32, 64, 96, 128, 256},
{2, 8, 16, 32, 64, 96, 192, 256},
{2, 8, 16, 32, 64, 128, 192, 256},
{2, 8, 16, 32, 96, 128, 192, 256},
{2, 8, 16, 64, 96, 128, 192, 256},
{2, 8, 32, 64, 96, 128, 192, 256},
{2, 16, 32, 64, 96, 128, 192, 256},
{4, 8, 16, 32, 64, 96, 128, 192},
{4, 8, 16, 32, 64, 96, 128, 256},
{4, 8, 16, 32, 64, 96, 192, 256},
{4, 8, 16, 32, 64, 128, 192, 256},
{4, 8, 16, 32, 96, 128, 192, 256},
{4, 8, 16, 64, 96, 128, 192, 256},
{4, 8, 32, 64, 96, 128, 192, 256},
{4, 16, 32, 64, 96, 128, 192, 256},
{8, 16, 32, 64, 96, 128, 192, 256}.

As an example, the offset indicating information indicates an offset of the NPRACH resource within the period, where the indicated offset may be in units of milliseconds.

Specifically, the offset indicated by the offset indicating information may be selected from any of the following sets, where elements in the set may be in units of milliseconds:
{0, 10, 20, 40, 80, 160, 320, 480},
{0, 10, 20, 40, 80, 160, 320, 640},
{0, 10, 20, 40, 80, 160, 320, 960},
{0, 10, 20, 40, 80, 160, 320, 1280},
{0, 10, 20, 40, 80, 160, 320, 1920},
{0, 10, 20, 40, 80, 160, 480, 640},
{0, 10, 20, 40, 80, 160, 480, 960},
{0, 10, 20, 40, 80, 160, 480, 1280},
{0, 10, 20, 40, 80, 160, 480, 1920},
{0, 10, 20, 40, 80, 160, 640, 960},
{0, 10, 20, 40, 80, 160, 640, 1280},
{0, 10, 20, 40, 80, 160, 640, 1920},
{0, 10, 20, 40, 80, 160, 960, 1280},
{0, 10, 20, 40, 80, 160, 960, 1920},
{0, 10, 20, 40, 80, 160, 1280, 1920},
{0, 10, 20, 40, 80, 320, 480, 640},
{0, 10, 20, 40, 80, 320, 480, 960},
{0, 10, 20, 40, 80, 320, 480, 1280},
{0, 10, 20, 40, 80, 320, 480, 1920},
{0, 10, 20, 40, 80, 320, 640, 960},
{0, 10, 20, 40, 80, 320, 640, 1280},
{0, 10, 20, 40, 80, 320, 640, 1920},
{0, 10, 20, 40, 80, 320, 960, 1280},
{0, 10, 20, 40, 80, 320, 960, 1920},
{0, 10, 20, 40, 80, 320, 1280, 1920},
{0, 10, 20, 40, 80, 480, 640, 960},
{0, 10, 20, 40, 80, 480, 640, 1280},
{0, 10, 20, 40, 80, 480, 640, 1920},
{0, 10, 20, 40, 80, 480, 960, 1280},
{0, 10, 20, 40, 80, 480, 960, 1920},
{0, 10, 20, 40, 80, 480, 1280, 1920},
{0, 10, 20, 40, 80, 640, 960, 1280},
{0, 10, 20, 40, 80, 640, 960, 1920},
{0, 10, 20, 40, 80, 640, 1280, 1920},
{0, 10, 20, 40, 80, 960, 1280, 1920},
{0, 10, 20, 40, 160, 320, 480, 640},
{0, 10, 20, 40, 160, 320, 480, 960},
{0, 10, 20, 40, 160, 320, 480, 1280},
{0, 10, 20, 40, 160, 320, 480, 1920},
{0, 10, 20, 40, 160, 320, 640, 960},
{0, 10, 20, 40, 160, 320, 640, 1280},
{0, 10, 20, 40, 160, 320, 640, 1920},
{0, 10, 20, 40, 160, 320, 960, 1280},
{0, 10, 20, 40, 160, 320, 960, 1920},
{0, 10, 20, 40, 160, 320, 1280, 1920},
{0, 10, 20, 40, 160, 480, 640, 960},
{0, 10, 20, 40, 160, 480, 640, 1280},
{0, 10, 20, 40, 160, 480, 640, 1920},
{0, 10, 20, 40, 160, 480, 960, 1280},
{0, 10, 20, 40, 160, 480, 960, 1920},
{0, 10, 20, 40, 160, 480, 1280, 1920},
{0, 10, 20, 40, 160, 640, 960, 1280},
{0, 10, 20, 40, 160, 640, 960, 1920},
{0, 10, 20, 40, 160, 640, 1280, 1920},
{0, 10, 20, 40, 160, 960, 1280, 1920}, {0, 10, 20, 40, 320, 480, 640, 960},
{0, 10, 20, 40, 320, 480, 640, 1280},
{0, 10, 20, 40, 320, 480, 640, 1920},
{0, 10, 20, 40, 320, 480, 960, 1280},
{0, 10, 20, 40, 320, 480, 960, 1920},
{0, 10, 20, 40, 320, 480, 1280, 1920},
{0, 10, 20, 40, 320, 640, 960, 1280},
{0, 10, 20, 40, 320, 640, 960, 1920},
{0, 10, 20, 40, 320, 640, 1280, 1920},
{0, 10, 20, 40, 320, 960, 1280, 1920},
{0, 10, 20, 40, 480, 640, 960, 1280},
{0, 10, 20, 40, 480, 640, 960, 1920},
{0, 10, 20, 40, 480, 640, 1280, 1920},
{0, 10, 20, 40, 480, 960, 1280, 1920},
{0, 10, 20, 40, 640, 960, 1280, 1920},
{0, 10, 20, 80, 160, 320, 480, 640},
{0, 10, 20, 80, 160, 320, 480, 960},
{0, 10, 20, 80, 160, 320, 480, 1280},
{0, 10, 20, 80, 160, 320, 480, 1920},
{0, 10, 20, 80, 160, 320, 640, 960},
{0, 10, 20, 80, 160, 320, 640, 1280},
{0, 10, 20, 80, 160, 320, 640, 1920},
{0, 10, 20, 80, 160, 320, 960, 1280},
{0, 10, 20, 80, 160, 320, 960, 1920},
{0, 10, 20, 80, 160, 320, 1280, 1920},
{0, 10, 20, 80, 160, 480, 640, 960},
{0, 10, 20, 80, 160, 480, 640, 1280},
{0, 10, 20, 80, 160, 480, 640, 1920},
{0, 10, 20, 80, 160, 480, 960, 1280},
{0, 10, 20, 80, 160, 480, 960, 1920},
{0, 10, 20, 80, 160, 480, 1280, 1920},
{0, 10, 20, 80, 160, 640, 960, 1280},
{0, 10, 20, 80, 160, 640, 960, 1920},
{0, 10, 20, 80, 160, 640, 1280, 1920},
{0, 10, 20, 80, 160, 960, 1280, 1920},
{0, 10, 20, 80, 320, 480, 640, 960},
{0, 10, 20, 80, 320, 480, 640, 1280},
{0, 10, 20, 80, 320, 480, 640, 1920},
{0, 10, 20, 80, 320, 480, 960, 1280},
{0, 10, 20, 80, 320, 480, 960, 1920},
{0, 10, 20, 80, 320, 480, 1280, 1920},
{0, 10, 20, 80, 320, 640, 960, 1280},
{0, 10, 20, 80, 320, 640, 960, 1920},
{0, 10, 20, 80, 320, 640, 1280, 1920},
{0, 10, 20, 80, 320, 960, 1280, 1920},
{0, 10, 20, 80, 480, 640, 960, 1280},
{0, 10, 20, 80, 480, 640, 960, 1920},
{0, 10, 20, 80, 480, 640, 1280, 1920},
{0, 10, 20, 80, 480, 960, 1280, 1920},
{0, 10, 20, 80, 640, 960, 1280, 1920},
{0, 10, 20, 160, 320, 480, 640, 960},
{0, 10, 20, 160, 320, 480, 640, 1280},
{0, 10, 20, 160, 320, 480, 640, 1920},
{0, 10, 20, 160, 320, 480, 960, 1280},
{0, 10, 20, 160, 320, 480, 960, 1920},
{0, 10, 20, 160, 320, 480, 1280, 1920},
{0, 10, 20, 160, 320, 640, 960, 1280},
{0, 10, 20, 160, 320, 640, 960, 1920},
{0, 10, 20, 160, 320, 640, 1280, 1920},
{0, 10, 20, 160, 320, 960, 1280, 1920},
{0, 10, 20, 160, 480, 640, 960, 1280},
{0, 10, 20, 160, 480, 640, 960, 1920},
{0, 10, 20, 160, 480, 640, 1280, 1920},
{0, 10, 20, 160, 480, 960, 1280, 1920},
{0, 10, 20, 160, 640, 960, 1280, 1920},
{0, 10, 20, 320, 480, 640, 960, 1280},
{0, 10, 20, 320, 480, 640, 960, 1920},
{0, 10, 20, 320, 480, 640, 1280, 1920},
{0, 10, 20, 320, 480, 960, 1280, 1920},
{0, 10, 20, 320, 640, 960, 1280, 1920},
{0, 10, 20, 480, 640, 960, 1280, 1920},
{0, 10, 40, 80, 160, 320, 480, 640},
{0, 10, 40, 80, 160, 320, 480, 960},
{0, 10, 40, 80, 160, 320, 480, 1280},
{0, 10, 40, 80, 160, 320, 480, 1920},
{0, 10, 40, 80, 160, 320, 640, 960},
{0, 10, 40, 80, 160, 320, 640, 1280},
{0, 10, 40, 80, 160, 320, 640, 1920},
{0, 10, 40, 80, 160, 320, 960, 1280},
{0, 10, 40, 80, 160, 320, 960, 1920},
{0, 10, 40, 80, 160, 320, 1280, 1920},
{0, 10, 40, 80, 160, 480, 640, 960},
{0, 10, 40, 80, 160, 480, 640, 1280},
{0, 10, 40, 80, 160, 480, 640, 1920},
{0, 10, 40, 80, 160, 480, 960, 1280},
{0, 10, 40, 80, 160, 480, 960, 1920},
{0, 10, 40, 80, 160, 480, 1280, 1920},
{0, 10, 40, 80, 160, 640, 960, 1280},
{0, 10, 40, 80, 160, 640, 960, 1920},
{0, 10, 40, 80, 160, 640, 1280, 1920},
{0, 10, 40, 80, 160, 960, 1280, 1920},
{0, 10, 40, 80, 320, 480, 640, 960},
{0, 10, 40, 80, 320, 480, 640, 1280},
{0, 10, 40, 80, 320, 480, 640, 1920},
{0, 10, 40, 80, 320, 480, 960, 1280},
{0, 10, 40, 80, 320, 480, 960, 1920},
{0, 10, 40, 80, 320, 480, 1280, 1920},
{0, 10, 40, 80, 320, 640, 960, 1280},
{0, 10, 40, 80, 320, 640, 960, 1920},
{0, 10, 40, 80, 320, 640, 1280, 1920},
{0, 10, 40, 80, 320, 960, 1280, 1920},
{0, 10, 40, 80, 480, 640, 960, 1280},
{0, 10, 40, 80, 480, 640, 960, 1920},
{0, 10, 40, 80, 480, 640, 1280, 1920},
{0, 10, 40, 80, 480, 960, 1280, 1920},
{0, 10, 40, 80, 640, 960, 1280, 1920},
{0, 10, 40, 160, 320, 480, 640, 960},
{0, 10, 40, 160, 320, 480, 640, 1280},
{0, 10, 40, 160, 320, 480, 640, 1920},
{0, 10, 40, 160, 320, 480, 960, 1280},
{0, 10, 40, 160, 320, 480, 960, 1920},
{0, 10, 40, 160, 320, 480, 1280, 1920},
{0, 10, 40, 160, 320, 640, 960, 1280},
{0, 10, 40, 160, 320, 640, 960, 1920},
{0, 10, 40, 160, 320, 640, 1280, 1920},
{0, 10, 40, 160, 320, 960, 1280, 1920},
{0, 10, 40, 160, 480, 640, 960, 1280},
{0, 10, 40, 160, 480, 640, 960, 1920},
{0, 10, 40, 160, 480, 640, 1280, 1920},
{0, 10, 40, 160, 480, 960, 1280, 1920},
{0, 10, 40, 160, 640, 960, 1280, 1920},
{0, 10, 40, 320, 480, 640, 960, 1280},
{0, 10, 40, 320, 480, 640, 960, 1920},
{0, 10, 40, 320, 480, 640, 1280, 1920},
{0, 10, 40, 320, 480, 960, 1280, 1920},
{0, 10, 40, 320, 640, 960, 1280, 1920},
{0, 10, 40, 480, 640, 960, 1280, 1920},
{0, 10, 80, 160, 320, 480, 640, 960},
{0, 10, 80, 160, 320, 480, 640, 1280},
{0, 10, 80, 160, 320, 480, 640, 1920},
{0, 10, 80, 160, 320, 480, 960, 1280},
{0, 10, 80, 160, 320, 480, 960, 1920},
{0, 10, 80, 160, 320, 480, 1280, 1920},
{0, 10, 80, 160, 320, 640, 960, 1280}, {0, 10, 80, 160, 320, 640, 960, 1920},
{0, 10, 80, 160, 320, 640, 1280, 1920},
{0, 10, 80, 160, 320, 960, 1280, 1920},
{0, 10, 80, 160, 480, 640, 960, 1280},
{0, 10, 80, 160, 480, 640, 960, 1920},
{0, 10, 80, 160, 480, 640, 1280, 1920},
{0, 10, 80, 160, 480, 960, 1280, 1920},
{0, 10, 80, 160, 640, 960, 1280, 1920},
{0, 10, 80, 320, 480, 640, 960, 1280},
{0, 10, 80, 320, 480, 640, 960, 1920},
{0, 10, 80, 320, 480, 640, 1280, 1920},
{0, 10, 80, 320, 480, 960, 1280, 1920},
{0, 10, 80, 320, 640, 960, 1280, 1920},
{0, 10, 80, 480, 640, 960, 1280, 1920},
{0, 10, 160, 320, 480, 640, 960, 1280},
{0, 10, 160, 320, 480, 640, 960, 1920},
{0, 10, 160, 320, 480, 640, 1280, 1920},
{0, 10, 160, 320, 480, 960, 1280, 1920},
{0, 10, 160, 320, 640, 960, 1280, 1920},
{0, 10, 160, 480, 640, 960, 1280, 1920},
{0, 10, 320, 480, 640, 960, 1280, 1920},
{0, 20, 40, 80, 160, 320, 480, 640},
{0, 20, 40, 80, 160, 320, 480, 960},
{0, 20, 40, 80, 160, 320, 480, 1280},
{0, 20, 40, 80, 160, 320, 480, 1920},
{0, 20, 40, 80, 160, 320, 640, 960},
{0, 20, 40, 80, 160, 320, 640, 1280},
{0, 20, 40, 80, 160, 320, 640, 1920},
{0, 20, 40, 80, 160, 320, 960, 1280},
{0, 20, 40, 80, 160, 320, 960, 1920},
{0, 20, 40, 80, 160, 320, 1280, 1920},
{0, 20, 40, 80, 160, 480, 640, 960},
{0, 20, 40, 80, 160, 480, 640, 1280},
{0, 20, 40, 80, 160, 480, 640, 1920},
{0, 20, 40, 80, 160, 480, 960, 1280},
{0, 20, 40, 80, 160, 480, 960, 1920},
{0, 20, 40, 80, 160, 480, 1280, 1920},
{0, 20, 40, 80, 160, 640, 960, 1280},
{0, 20, 40, 80, 160, 640, 960, 1920},
{0, 20, 40, 80, 160, 640, 1280, 1920},
{0, 20, 40, 80, 160, 960, 1280, 1920},
{0, 20, 40, 80, 320, 480, 640, 960},
{0, 20, 40, 80, 320, 480, 640, 1280},
{0, 20, 40, 80, 320, 480, 640, 1920},
{0, 20, 40, 80, 320, 480, 960, 1280},
{0, 20, 40, 80, 320, 480, 960, 1920},
{0, 20, 40, 80, 320, 480, 1280, 1920},
{0, 20, 40, 80, 320, 640, 960, 1280},
{0, 20, 40, 80, 320, 640, 960, 1920},
{0, 20, 40, 80, 320, 640, 1280, 1920},
{0, 20, 40, 80, 320, 960, 1280, 1920},
{0, 20, 40, 80, 480, 640, 960, 1280},
{0, 20, 40, 80, 480, 640, 960, 1920},
{0, 20, 40, 80, 480, 640, 1280, 1920},
{0, 20, 40, 80, 480, 960, 1280, 1920},
{0, 20, 40, 80, 640, 960, 1280, 1920},
{0, 20, 40, 160, 320, 480, 640, 960},
{0, 20, 40, 160, 320, 480, 640, 1280},
{0, 20, 40, 160, 320, 480, 640, 1920},
{0, 20, 40, 160, 320, 480, 960, 1280},
{0, 20, 40, 160, 320, 480, 960, 1920},
{0, 20, 40, 160, 320, 480, 1280, 1920},
{0, 20, 40, 160, 320, 640, 960, 1280},
{0, 20, 40, 160, 320, 640, 960, 1920},
{0, 20, 40, 160, 320, 640, 1280, 1920},
{0, 20, 40, 160, 320, 960, 1280, 1920},
{0, 20, 40, 160, 480, 640, 960, 1280}, {0, 20, 40, 160, 480, 640, 960, 1920},
{0, 20, 40, 160, 480, 640, 1280, 1920},
{0, 20, 40, 160, 480, 960, 1280, 1920},
{0, 20, 40, 160, 640, 960, 1280, 1920},
{0, 20, 40, 320, 480, 640, 960, 1280},
{0, 20, 40, 320, 480, 640, 960, 1920},
{0, 20, 40, 320, 480, 640, 1280, 1920},
{0, 20, 40, 320, 480, 960, 1280, 1920},
{0, 20, 40, 320, 640, 960, 1280, 1920},
{0, 20, 40, 480, 640, 960, 1280, 1920},
{0, 20, 80, 160, 320, 480, 640, 960},
{0, 20, 80, 160, 320, 480, 640, 1280},
{0, 20, 80, 160, 320, 480, 640, 1920},
{0, 20, 80, 160, 320, 480, 960, 1280},
{0, 20, 80, 160, 320, 480, 960, 1920},
{0, 20, 80, 160, 320, 480, 1280, 1920},
{0, 20, 80, 160, 320, 640, 960, 1280},
{0, 20, 80, 160, 320, 640, 960, 1920},
{0, 20, 80, 160, 320, 640, 1280, 1920},
{0, 20, 80, 160, 320, 960, 1280, 1920},
{0, 20, 80, 160, 480, 640, 960, 1280},
{0, 20, 80, 160, 480, 640, 960, 1920},
{0, 20, 80, 160, 480, 640, 1280, 1920},
{0, 20, 80, 160, 480, 960, 1280, 1920},
{0, 20, 80, 160, 640, 960, 1280, 1920},
{0, 20, 80, 320, 480, 640, 960, 1280},
{0, 20, 80, 320, 480, 640, 960, 1920},
{0, 20, 80, 320, 480, 640, 1280, 1920},
{0, 20, 80, 320, 480, 960, 1280, 1920},
{0, 20, 80, 320, 640, 960, 1280, 1920},
{0, 20, 80, 480, 640, 960, 1280, 1920},
{0, 20, 160, 320, 480, 640, 960, 1280},
{0, 20, 160, 320, 480, 640, 960, 1920},
{0, 20, 160, 320, 480, 640, 1280, 1920},
{0, 20, 160, 320, 480, 960, 1280, 1920},
{0, 20, 160, 320, 640, 960, 1280, 1920},
{0, 20, 160, 480, 640, 960, 1280, 1920},
{0, 20, 320, 480, 640, 960, 1280, 1920},
{0, 40, 80, 160, 320, 480, 640, 960},
{0, 40, 80, 160, 320, 480, 640, 1280},
{0, 40, 80, 160, 320, 480, 640, 1920},
{0, 40, 80, 160, 320, 480, 960, 1280},
{0, 40, 80, 160, 320, 480, 960, 1920},
{0, 40, 80, 160, 320, 480, 1280, 1920},
{0, 40, 80, 160, 320, 640, 960, 1280},
{0, 40, 80, 160, 320, 640, 960, 1920},
{0, 40, 80, 160, 320, 640, 1280, 1920},
{0, 40, 80, 160, 320, 960, 1280, 1920},
{0, 40, 80, 160, 480, 640, 960, 1280},
{0, 40, 80, 160, 480, 640, 960, 1920},
{0, 40, 80, 160, 480, 640, 1280, 1920},
{0, 40, 80, 160, 480, 960, 1280, 1920},
{0, 40, 80, 160, 640, 960, 1280, 1920},
{0, 40, 80, 320, 480, 640, 960, 1280},
{0, 40, 80, 320, 480, 640, 960, 1920},
{0, 40, 80, 320, 480, 640, 1280, 1920},
{0, 40, 80, 320, 480, 960, 1280, 1920},
{0, 40, 80, 320, 640, 960, 1280, 1920},
{0, 40, 80, 480, 640, 960, 1280, 1920},
{0, 40, 160, 320, 480, 640, 960, 1280},
{0, 40, 160, 320, 480, 640, 960, 1920},
{0, 40, 160, 320, 480, 640, 1280, 1920},
{0, 40, 160, 320, 480, 960, 1280, 1920},
{0, 40, 160, 320, 640, 960, 1280, 1920},
{0, 40, 160, 480, 640, 960, 1280, 1920},
{0, 40, 320, 480, 640, 960, 1280, 1920},
{0, 80, 160, 320, 480, 640, 960, 1280}, {0, 80, 160, 320, 480, 640, 960, 1920},
{0, 80, 160, 320, 480, 640, 1280, 1920},
{0, 80, 160, 320, 480, 960, 1280, 1920},
{0, 80, 160, 320, 640, 960, 1280, 1920},
{0, 80, 160, 480, 640, 960, 1280, 1920},
{0, 80, 320, 480, 640, 960, 1280, 1920},
{0, 160, 320, 480, 640, 960, 1280, 1920},
{10, 20, 40, 80, 160, 320, 480, 640},
{10, 20, 40, 80, 160, 320, 480, 960},
{10, 20, 40, 80, 160, 320, 480, 1280},
{10, 20, 40, 80, 160, 320, 480, 1920},
{10, 20, 40, 80, 160, 320, 640, 960},
{10, 20, 40, 80, 160, 320, 640, 1280},
{10, 20, 40, 80, 160, 320, 640, 1920},
{10, 20, 40, 80, 160, 320, 960, 1280},
{10, 20, 40, 80, 160, 320, 960, 1920},
{10, 20, 40, 80, 160, 320, 1280, 1920},
{10, 20, 40, 80, 160, 480, 640, 960},
{10, 20, 40, 80, 160, 480, 640, 1280},
{10, 20, 40, 80, 160, 480, 640, 1920},
{10, 20, 40, 80, 160, 480, 960, 1280},
{10, 20, 40, 80, 160, 480, 960, 1920},
{10, 20, 40, 80, 160, 480, 1280, 1920},
{10, 20, 40, 80, 160, 640, 960, 1280},
{10, 20, 40, 80, 160, 640, 960, 1920},
{10, 20, 40, 80, 160, 640, 1280, 1920},
{10, 20, 40, 80, 160, 960, 1280, 1920},
{10, 20, 40, 80, 320, 480, 640, 960},
{10, 20, 40, 80, 320, 480, 640, 1280},
{10, 20, 40, 80, 320, 480, 640, 1920},
{10, 20, 40, 80, 320, 480, 960, 1280},
{10, 20, 40, 80, 320, 480, 960, 1920},
{10, 20, 40, 80, 320, 480, 1280, 1920},
{10, 20, 40, 80, 320, 640, 960, 1280},
{10, 20, 40, 80, 320, 640, 960, 1920},
{10, 20, 40, 80, 320, 640, 1280, 1920},
{10, 20, 40, 80, 320, 960, 1280, 1920},
{10, 20, 40, 80, 480, 640, 960, 1280},
{10, 20, 40, 80, 480, 640, 960, 1920},
{10, 20, 40, 80, 480, 640, 1280, 1920},
{10, 20, 40, 80, 480, 960, 1280, 1920},
{10, 20, 40, 80, 640, 960, 1280, 1920},
{10, 20, 40, 160, 320, 480, 640, 960},
{10, 20, 40, 160, 320, 480, 640, 1280},
{10, 20, 40, 160, 320, 480, 640, 1920},
{10, 20, 40, 160, 320, 480, 960, 1280},
{10, 20, 40, 160, 320, 480, 960, 1920},
{10, 20, 40, 160, 320, 480, 1280, 1920},
{10, 20, 40, 160, 320, 640, 960, 1280},
{10, 20, 40, 160, 320, 640, 960, 1920},
{10, 20, 40, 160, 320, 640, 1280, 1920},
{10, 20, 40, 160, 320, 960, 1280, 1920},
{10, 20, 40, 160, 480, 640, 960, 1280},
{10, 20, 40, 160, 480, 640, 960, 1920},
{10, 20, 40, 160, 480, 640, 1280, 1920},
{10, 20, 40, 160, 480, 960, 1280, 1920},
{10, 20, 40, 160, 640, 960, 1280, 1920},
{10, 20, 40, 320, 480, 640, 960, 1280},
{10, 20, 40, 320, 480, 640, 960, 1920},
{10, 20, 40, 320, 480, 640, 1280, 1920},
{10, 20, 40, 320, 480, 960, 1280, 1920},
{10, 20, 40, 320, 640, 960, 1280, 1920},
{10, 20, 40, 480, 640, 960, 1280, 1920},
{10, 20, 80, 160, 320, 480, 640, 960},
{10, 20, 80, 160, 320, 480, 640, 1280},
{10, 20, 80, 160, 320, 480, 640, 1920},
{10, 20, 80, 160, 320, 480, 960, 1280},
{10, 20, 80, 160, 320, 480, 960, 1920},
{10, 20, 80, 160, 320, 480, 1280, 1920},
{10, 20, 80, 160, 320, 640, 960, 1280},
{10, 20, 80, 160, 320, 640, 960, 1920},
{10, 20, 80, 160, 320, 640, 1280, 1920},
{10, 20, 80, 160, 320, 960, 1280, 1920},
{10, 20, 80, 160, 480, 640, 960, 1280},
{10, 20, 80, 160, 480, 640, 960, 1920},
{10, 20, 80, 160, 480, 640, 1280, 1920},
{10, 20, 80, 160, 480, 960, 1280, 1920},
{10, 20, 80, 160, 640, 960, 1280, 1920},
{10, 20, 80, 320, 480, 640, 960, 1280},
{10, 20, 80, 320, 480, 640, 960, 1920},
{10, 20, 80, 320, 480, 640, 1280, 1920},
{10, 20, 80, 320, 480, 960, 1280, 1920},
{10, 20, 80, 320, 640, 960, 1280, 1920},
{10, 20, 80, 480, 640, 960, 1280, 1920},
{10, 20, 160, 320, 480, 640, 960, 1280},
{10, 20, 160, 320, 480, 640, 960, 1920},
{10, 20, 160, 320, 480, 640, 1280, 1920},
{10, 20, 160, 320, 480, 960, 1280, 1920},
{10, 20, 160, 320, 640, 960, 1280, 1920},
{10, 20, 160, 480, 640, 960, 1280, 1920},
{10, 20, 320, 480, 640, 960, 1280, 1920},
{10, 40, 80, 160, 320, 480, 640, 960},
{10, 40, 80, 160, 320, 480, 640, 1280},
{10, 40, 80, 160, 320, 480, 640, 1920},
{10, 40, 80, 160, 320, 480, 960, 1280},
{10, 40, 80, 160, 320, 480, 960, 1920},
{10, 40, 80, 160, 320, 480, 1280, 1920},
{10, 40, 80, 160, 320, 640, 960, 1280},
{10, 40, 80, 160, 320, 640, 960, 1920},
{10, 40, 80, 160, 320, 640, 1280, 1920},
{10, 40, 80, 160, 320, 960, 1280, 1920},
{10, 40, 80, 160, 480, 640, 960, 1280},
{10, 40, 80, 160, 480, 640, 960, 1920},
{10, 40, 80, 160, 480, 640, 1280, 1920},
{10, 40, 80, 160, 480, 960, 1280, 1920},
{10, 40, 80, 160, 640, 960, 1280, 1920},
{10, 40, 80, 320, 480, 640, 960, 1280},
{10, 40, 80, 320, 480, 640, 960, 1920},
{10, 40, 80, 320, 480, 640, 1280, 1920},
{10, 40, 80, 320, 480, 960, 1280, 1920},
{10, 40, 80, 320, 640, 960, 1280, 1920},
{10, 40, 80, 480, 640, 960, 1280, 1920},
{10, 40, 160, 320, 480, 640, 960, 1280},
{10, 40, 160, 320, 480, 640, 960, 1920},
{10, 40, 160, 320, 480, 640, 1280, 1920},
{10, 40, 160, 320, 480, 960, 1280, 1920},
{10, 40, 160, 320, 640, 960, 1280, 1920},
{10, 40, 160, 480, 640, 960, 1280, 1920},
{10, 40, 320, 480, 640, 960, 1280, 1920},
{10, 80, 160, 320, 480, 640, 960, 1280},
{10, 80, 160, 320, 480, 640, 960, 1920},
{10, 80, 160, 320, 480, 640, 1280, 1920},
{10, 80, 160, 320, 480, 960, 1280, 1920},
{10, 80, 160, 320, 640, 960, 1280, 1920},
{10, 80, 160, 480, 640, 960, 1280, 1920},
{10, 80, 320, 480, 640, 960, 1280, 1920},
{10, 160, 320, 480, 640, 960, 1280, 1920},
{20, 40, 80, 160, 320, 480, 640, 960},
{20, 40, 80, 160, 320, 480, 640, 1280},
{20, 40, 80, 160, 320, 480, 640, 1920},
{20, 40, 80, 160, 320, 480, 960, 1280},
{20, 40, 80, 160, 320, 480, 960, 1920},
{20, 40, 80, 160, 320, 480, 1280, 1920},
{20, 40, 80, 160, 320, 640, 960, 1280}, {20, 40, 80, 160, 320, 640, 960, 1920},
{20, 40, 80, 160, 320, 640, 1280, 1920},
{20, 40, 80, 160, 320, 960, 1280, 1920},
{20, 40, 80, 160, 480, 640, 960, 1280},
{20, 40, 80, 160, 480, 640, 960, 1920},
{20, 40, 80, 160, 480, 640, 1280, 1920},
{20, 40, 80, 160, 480, 960, 1280, 1920},
{20, 40, 80, 160, 640, 960, 1280, 1920},
{20, 40, 80, 320, 480, 640, 960, 1280},
{20, 40, 80, 320, 480, 640, 960, 1920},
{20, 40, 80, 320, 480, 640, 1280, 1920},
{20, 40, 80, 320, 480, 960, 1280, 1920},
{20, 40, 80, 320, 640, 960, 1280, 1920},
{20, 40, 80, 480, 640, 960, 1280, 1920},
{20, 40, 160, 320, 480, 640, 960, 1280},
{20, 40, 160, 320, 480, 640, 960, 1920},
{20, 40, 160, 320, 480, 640, 1280, 1920},
{20, 40, 160, 320, 480, 960, 1280, 1920},
{20, 40, 160, 320, 640, 960, 1280, 1920},
{20, 40, 160, 480, 640, 960, 1280, 1920},
{20, 40, 320, 480, 640, 960, 1280, 1920},
{20, 80, 160, 320, 480, 640, 960, 1280},
{20, 80, 160, 320, 480, 640, 960, 1920},
{20, 80, 160, 320, 480, 640, 1280, 1920},
{20, 80, 160, 320, 480, 960, 1280, 1920},
{20, 80, 160, 320, 640, 960, 1280, 1920},
{20, 80, 160, 480, 640, 960, 1280, 1920},
{20, 80, 320, 480, 640, 960, 1280, 1920},
{20, 160, 320, 480, 640, 960, 1280, 1920},
{40, 80, 160, 320, 480, 640, 960, 1280},
{40, 80, 160, 320, 480, 640, 960, 1920},
{40, 80, 160, 320, 480, 640, 1280, 1920},
{40, 80, 160, 320, 480, 960, 1280, 1920},
{40, 80, 160, 320, 640, 960, 1280, 1920},
{40, 80, 160, 480, 640, 960, 1280, 1920},
{40, 80, 320, 480, 640, 960, 1280, 1920},
{40, 160, 320, 480, 640, 960, 1280, 1920},
{80, 160, 320, 480, 640, 960, 1280, 1920},
{0, 5, 10, 20, 40, 80, 160, 320},
{0, 5, 10, 20, 40, 80, 160, 480},
{0, 5, 10, 20, 40, 80, 160, 640},
{0, 5, 10, 20, 40, 80, 160, 960},
{0, 5, 10, 20, 40, 80, 160, 1280},
{0, 5, 10, 20, 40, 80, 320, 480},
{0, 5, 10, 20, 40, 80, 320, 640},
{0, 5, 10, 20, 40, 80, 320, 960},
{0, 5, 10, 20, 40, 80, 320, 1280},
{0, 5, 10, 20, 40, 80, 480, 640},
{0, 5, 10, 20, 40, 80, 480, 960},
{0, 5, 10, 20, 40, 80, 480, 1280},
{0, 5, 10, 20, 40, 80, 640, 960},
{0, 5, 10, 20, 40, 80, 640, 1280},
{0, 5, 10, 20, 40, 80, 960, 1280},
{0, 5, 10, 20, 40, 160, 320, 480},
{0, 5, 10, 20, 40, 160, 320, 640},
{0, 5, 10, 20, 40, 160, 320, 960},
{0, 5, 10, 20, 40, 160, 320, 1280},
{0, 5, 10, 20, 40, 160, 480, 640},
{0, 5, 10, 20, 40, 160, 480, 960},
{0, 5, 10, 20, 40, 160, 480, 1280},
{0, 5, 10, 20, 40, 160, 640, 960},
{0, 5, 10, 20, 40, 160, 640, 1280},
{0, 5, 10, 20, 40, 160, 960, 1280},
{0, 5, 10, 20, 40, 320, 480, 640},
{0, 5, 10, 20, 40, 320, 480, 960},
{0, 5, 10, 20, 40, 320, 480, 1280},
{0, 5, 10, 20, 40, 320, 640, 960},
{0, 5, 10, 20, 40, 320, 640, 1280},
{0, 5, 10, 20, 40, 320, 960, 1280},
{0, 5, 10, 20, 40, 480, 640, 960},
{0, 5, 10, 20, 40, 480, 640, 1280},
{0, 5, 10, 20, 40, 480, 960, 1280},
{0, 5, 10, 20, 40, 640, 960, 1280},
{0, 5, 10, 20, 80, 160, 320, 480},
{0, 5, 10, 20, 80, 160, 320, 640},
{0, 5, 10, 20, 80, 160, 320, 960},
{0, 5, 10, 20, 80, 160, 320, 1280},
{0, 5, 10, 20, 80, 160, 480, 640},
{0, 5, 10, 20, 80, 160, 480, 960},
{0, 5, 10, 20, 80, 160, 480, 1280},
{0, 5, 10, 20, 80, 160, 640, 960},
{0, 5, 10, 20, 80, 160, 640, 1280},
{0, 5, 10, 20, 80, 160, 960, 1280},
{0, 5, 10, 20, 80, 320, 480, 640},
{0, 5, 10, 20, 80, 320, 480, 960},
{0, 5, 10, 20, 80, 320, 480, 1280},
{0, 5, 10, 20, 80, 320, 640, 960},
{0, 5, 10, 20, 80, 320, 640, 1280},
{0, 5, 10, 20, 80, 320, 960, 1280},
{0, 5, 10, 20, 80, 480, 640, 960},
{0, 5, 10, 20, 80, 480, 640, 1280},
{0, 5, 10, 20, 80, 480, 960, 1280},
{0, 5, 10, 20, 80, 640, 960, 1280},
{0, 5, 10, 20, 160, 320, 480, 640},
{0, 5, 10, 20, 160, 320, 480, 960},
{0, 5, 10, 20, 160, 320, 480, 1280},
{0, 5, 10, 20, 160, 320, 640, 960},
{0, 5, 10, 20, 160, 320, 640, 1280},
{0, 5, 10, 20, 160, 320, 960, 1280},
{0, 5, 10, 20, 160, 480, 640, 960},
{0, 5, 10, 20, 160, 480, 640, 1280},
{0, 5, 10, 20, 160, 480, 960, 1280},
{0, 5, 10, 20, 160, 640, 960, 1280},
{0, 5, 10, 20, 320, 480, 640, 960},
{0, 5, 10, 20, 320, 480, 640, 1280},
{0, 5, 10, 20, 320, 480, 960, 1280},
{0, 5, 10, 20, 320, 640, 960, 1280},
{0, 5, 10, 20, 480, 640, 960, 1280},
{0, 5, 10, 40, 80, 160, 320, 480},
{0, 5, 10, 40, 80, 160, 320, 640},
{0, 5, 10, 40, 80, 160, 320, 960},
{0, 5, 10, 40, 80, 160, 320, 1280},
{0, 5, 10, 40, 80, 160, 480, 640},
{0, 5, 10, 40, 80, 160, 480, 960},
{0, 5, 10, 40, 80, 160, 480, 1280},
{0, 5, 10, 40, 80, 160, 640, 960},
{0, 5, 10, 40, 80, 160, 640, 1280},
{0, 5, 10, 40, 80, 160, 960, 1280}
{0, 5, 10, 40, 80, 320, 480, 640},
{0, 5, 10, 40, 80, 320, 480, 960},
{0, 5, 10, 40, 80, 320, 480, 1280},
{0, 5, 10, 40, 80, 320, 640, 960},
{0, 5, 10, 40, 80, 320, 640, 1280},
{0, 5, 10, 40, 80, 320, 960, 1280},
{0, 5, 10, 40, 80, 480, 640, 960},
{0, 5, 10, 40, 80, 480, 640, 1280},
{0, 5, 10, 40, 80, 480, 960, 1280},
{0, 5, 10, 40, 80, 640, 960, 1280},
{0, 5, 10, 40, 160, 320, 480, 640},
{0, 5, 10, 40, 160, 320, 480, 960},
{0, 5, 10, 40, 160, 320, 480, 1280},
{0, 5, 10, 40, 160, 320, 640, 960},
{0, 5, 10, 40, 160, 320, 640, 1280},
{0, 5, 10, 40, 160, 320, 960, 1280}, {0, 5, 10, 40, 160, 480, 640, 960},
{0, 5, 10, 40, 160, 480, 640, 1280},
{0, 5, 10, 40, 160, 480, 960, 1280},
{0, 5, 10, 40, 160, 640, 960, 1280},
{0, 5, 10, 40, 320, 480, 640, 960},
{0, 5, 10, 40, 320, 480, 640, 1280},
{0, 5, 10, 40, 320, 480, 960, 1280},
{0, 5, 10, 40, 320, 640, 960, 1280},
{0, 5, 10, 40, 480, 640, 960, 1280},
{0, 5, 10, 80, 160, 320, 480, 640},
{0, 5, 10, 80, 160, 320, 480, 960},
{0, 5, 10, 80, 160, 320, 480, 1280},
{0, 5, 10, 80, 160, 320, 640, 960},
{0, 5, 10, 80, 160, 320, 640, 1280},
{0, 5, 10, 80, 160, 320, 960, 1280},
{0, 5, 10, 80, 160, 480, 640, 960},
{0, 5, 10, 80, 160, 480, 640, 1280},
{0, 5, 10, 80, 160, 480, 960, 1280},
{0, 5, 10, 80, 160, 640, 960, 1280},
{0, 5, 10, 80, 320, 480, 640, 960},
{0, 5, 10, 80, 320, 480, 640, 1280},
{0, 5, 10, 80, 320, 480, 960, 1280},
{0, 5, 10, 80, 320, 640, 960, 1280},
{0, 5, 10, 80, 480, 640, 960, 1280},
{0, 5, 10, 160, 320, 480, 640, 960},
{0, 5, 10, 160, 320, 480, 640, 1280},
{0, 5, 10, 160, 320, 480, 960, 1280},
{0, 5, 10, 160, 320, 640, 960, 1280},
{0, 5, 10, 160, 480, 640, 960, 1280},
{0, 5, 10, 320, 480, 640, 960, 1280},
{0, 5, 20, 40, 80, 160, 320, 480},
{0, 5, 20, 40, 80, 160, 320, 640},
{0, 5, 20, 40, 80, 160, 320, 960},
{0, 5, 20, 40, 80, 160, 320, 1280},
{0, 5, 20, 40, 80, 160, 480, 640},
{0, 5, 20, 40, 80, 160, 480, 960},
{0, 5, 20, 40, 80, 160, 480, 1280},
{0, 5, 20, 40, 80, 160, 640, 960},
{0, 5, 20, 40, 80, 160, 640, 1280},
{0, 5, 20, 40, 80, 160, 960, 1280},
{0, 5, 20, 40, 80, 320, 480, 640},
{0, 5, 20, 40, 80, 320, 480, 960},
{0, 5, 20, 40, 80, 320, 480, 1280},
{0, 5, 20, 40, 80, 320, 640, 960},
{0, 5, 20, 40, 80, 320, 640, 1280},
{0, 5, 20, 40, 80, 320, 960, 1280},
{0, 5, 20, 40, 80, 480, 640, 960},
{0, 5, 20, 40, 80, 480, 640, 1280},
{0, 5, 20, 40, 80, 480, 960, 1280},
{0, 5, 20, 40, 80, 640, 960, 1280},
{0, 5, 20, 40, 160, 320, 480, 640},
{0, 5, 20, 40, 160, 320, 480, 960},
{0, 5, 20, 40, 160, 320, 480, 1280},
{0, 5, 20, 40, 160, 320, 640, 960},
{0, 5, 20, 40, 160, 320, 640, 1280},
{0, 5, 20, 40, 160, 320, 960, 1280},
{0, 5, 20, 40, 160, 480, 640, 960},
{0, 5, 20, 40, 160, 480, 640, 1280},
{0, 5, 20, 40, 160, 480, 960, 1280},
{0, 5, 20, 40, 160, 640, 960, 1280},
{0, 5, 20, 40, 320, 480, 640, 960},
{0, 5, 20, 40, 320, 480, 640, 1280},
{0, 5, 20, 40, 320, 480, 960, 1280},
{0, 5, 20, 40, 320, 640, 960, 1280},
{0, 5, 20, 40, 480, 640, 960, 1280},
{0, 5, 20, 80, 160, 320, 480, 640},
{0, 5, 20, 80, 160, 320, 480, 960},
{0, 5, 20, 80, 160, 320, 480, 1280},
{0, 5, 20, 80, 160, 320, 640, 960},
{0, 5, 20, 80, 160, 320, 640, 1280},
{0, 5, 20, 80, 160, 320, 960, 1280},
{0, 5, 20, 80, 160, 480, 640, 960},
{0, 5, 20, 80, 160, 480, 640, 1280},
{0, 5, 20, 80, 160, 480, 960, 1280},
{0, 5, 20, 80, 160, 640, 960, 1280},
{0, 5, 20, 80, 320, 480, 640, 960},
{0, 5, 20, 80, 320, 480, 640, 1280},
{0, 5, 20, 80, 320, 480, 960, 1280},
{0, 5, 20, 80, 320, 640, 960, 1280},
{0, 5, 20, 80, 480, 640, 960, 1280},
{0, 5, 20, 160, 320, 480, 640, 960},
{0, 5, 20, 160, 320, 480, 640, 1280},
{0, 5, 20, 160, 320, 480, 960, 1280},
{0, 5, 20, 160, 320, 640, 960, 1280},
{0, 5, 20, 160, 480, 640, 960, 1280},
{0, 5, 20, 320, 480, 640, 960, 1280},
{0, 5, 40, 80, 160, 320, 480, 640},
{0, 5, 40, 80, 160, 320, 480, 960},
{0, 5, 40, 80, 160, 320, 480, 1280},
{0, 5, 40, 80, 160, 320, 640, 960},
{0, 5, 40, 80, 160, 320, 640, 1280},
{0, 5, 40, 80, 160, 320, 960, 1280},
{0, 5, 40, 80, 160, 480, 640, 960},
{0, 5, 40, 80, 160, 480, 640, 1280},
{0, 5, 40, 80, 160, 480, 960, 1280},
{0, 5, 40, 80, 160, 640, 960, 1280},
{0, 5, 40, 80, 320, 480, 640, 960},
{0, 5, 40, 80, 320, 480, 640, 1280},
{0, 5, 40, 80, 320, 480, 960, 1280},
{0, 5, 40, 80, 320, 640, 960, 1280},
{0, 5, 40, 80, 480, 640, 960, 1280},
{0, 5, 40, 160, 320, 480, 640, 960},
{0, 5, 40, 160, 320, 480, 640, 1280},
{0, 5, 40, 160, 320, 480, 960, 1280},
{0, 5, 40, 160, 320, 640, 960, 1280},
{0, 5, 40, 160, 480, 640, 960, 1280},
{0, 5, 40, 320, 480, 640, 960, 1280},
{0, 5, 80, 160, 320, 480, 640, 960},
{0, 5, 80, 160, 320, 480, 640, 1280},
{0, 5, 80, 160, 320, 480, 960, 1280},
{0, 5, 80, 160, 320, 640, 960, 1280},
{0, 5, 80, 160, 480, 640, 960, 1280},
{0, 5, 80, 320, 480, 640, 960, 1280},
{0, 5, 160, 320, 480, 640, 960, 1280},
{0, 10, 20, 40, 80, 160, 320, 480},
{0, 10, 20, 40, 80, 160, 320, 640},
{0, 10, 20, 40, 80, 160, 320, 960},
{0, 10, 20, 40, 80, 160, 320, 1280},
{0, 10, 20, 40, 80, 160, 480, 640},
{0, 10, 20, 40, 80, 160, 480, 960},
{0, 10, 20, 40, 80, 160, 480, 1280},
{0, 10, 20, 40, 80, 160, 640, 960},
{0, 10, 20, 40, 80, 160, 640, 1280},
{0, 10, 20, 40, 80, 160, 960, 1280},
{0, 10, 20, 40, 80, 320, 480, 640},
{0, 10, 20, 40, 80, 320, 480, 960},
{0, 10, 20, 40, 80, 320, 480, 1280},
{0, 10, 20, 40, 80, 320, 640, 960},
{0, 10, 20, 40, 80, 320, 640, 1280},
{0, 10, 20, 40, 80, 320, 960, 1280},
{0, 10, 20, 40, 80, 480, 640, 960},
{0, 10, 20, 40, 80, 480, 640, 1280},
{0, 10, 20, 40, 80, 480, 960, 1280},
{0, 10, 20, 40, 80, 640, 960, 1280}, {0, 10, 20, 40, 160, 320, 480, 640},
{0, 10, 20, 40, 160, 320, 480, 960},
{0, 10, 20, 40, 160, 320, 480, 1280},
{0, 10, 20, 40, 160, 320, 640, 960},
{0, 10, 20, 40, 160, 320, 640, 1280},
{0, 10, 20, 40, 160, 320, 960, 1280},
{0, 10, 20, 40, 160, 480, 640, 960},
{0, 10, 20, 40, 160, 480, 640, 1280},
{0, 10, 20, 40, 160, 480, 960, 1280},
{0, 10, 20, 40, 160, 640, 960, 1280},
{0, 10, 20, 40, 320, 480, 640, 960},
{0, 10, 20, 40, 320, 480, 640, 1280},
{0, 10, 20, 40, 320, 480, 960, 1280},
{0, 10, 20, 40, 320, 640, 960, 1280},
{0, 10, 20, 40, 480, 640, 960, 1280},
{0, 10, 20, 80, 160, 320, 480, 640},
{0, 10, 20, 80, 160, 320, 480, 960},
{0, 10, 20, 80, 160, 320, 480, 1280},
{0, 10, 20, 80, 160, 320, 640, 960},
{0, 10, 20, 80, 160, 320, 640, 1280},
{0, 10, 20, 80, 160, 320, 960, 1280},
{0, 10, 20, 80, 160, 480, 640, 960},
{0, 10, 20, 80, 160, 480, 640, 1280},
{0, 10, 20, 80, 160, 480, 960, 1280},
{0, 10, 20, 80, 160, 640, 960, 1280},
{0, 10, 20, 80, 320, 480, 640, 960},
{0, 10, 20, 80, 320, 480, 640, 1280},
{0, 10, 20, 80, 320, 480, 960, 1280},
{0, 10, 20, 80, 320, 640, 960, 1280},
{0, 10, 20, 80, 480, 640, 960, 1280},
{0, 10, 20, 160, 320, 480, 640, 960},
{0, 10, 20, 160, 320, 480, 640, 1280},
{0, 10, 20, 160, 320, 480, 960, 1280},
{0, 10, 20, 160, 320, 640, 960, 1280},
{0, 10, 20, 160, 480, 640, 960, 1280},
{0, 10, 20, 320, 480, 640, 960, 1280},
{0, 10, 40, 80, 160, 320, 480, 640},
{0, 10, 40, 80, 160, 320, 480, 960},
{0, 10, 40, 80, 160, 320, 480, 1280},
{0, 10, 40, 80, 160, 320, 640, 960},
{0, 10, 40, 80, 160, 320, 640, 1280},
{0, 10, 40, 80, 160, 320, 960, 1280},
{0, 10, 40, 80, 160, 480, 640, 960},
{0, 10, 40, 80, 160, 480, 640, 1280},
{0, 10, 40, 80, 160, 480, 960, 1280},
{0, 10, 40, 80, 160, 640, 960, 1280},
{0, 10, 40, 80, 320, 480, 640, 960},
{0, 10, 40, 80, 320, 480, 640, 1280},
{0, 10, 40, 80, 320, 480, 960, 1280},
{0, 10, 40, 80, 320, 640, 960, 1280},
{0, 10, 40, 80, 480, 640, 960, 1280},
{0, 10, 40, 160, 320, 480, 640, 960},
{0, 10, 40, 160, 320, 480, 640, 1280},
{0, 10, 40, 160, 320, 480, 960, 1280},
{0, 10, 40, 160, 320, 640, 960, 1280},
{0, 10, 40, 160, 480, 640, 960, 1280},
{0, 10, 40, 320, 480, 640, 960, 1280},
{0, 10, 80, 160, 320, 480, 640, 960},
{0, 10, 80, 160, 320, 480, 640, 1280},
{0, 10, 80, 160, 320, 480, 960, 1280},
{0, 10, 80, 160, 320, 640, 960, 1280},
{0, 10, 80, 160, 480, 640, 960, 1280},
{0, 10, 80, 320, 480, 640, 960, 1280},
{0, 10, 160, 320, 480, 640, 960, 1280},
{0, 20, 40, 80, 160, 320, 480, 640},
{0, 20, 40, 80, 160, 320, 480, 960},
{0, 20, 40, 80, 160, 320, 480, 1280},
{0, 20, 40, 80, 160, 320, 640, 960},
{0, 20, 40, 80, 160, 320, 640, 1280},
{0, 20, 40, 80, 160, 320, 960, 1280},
{0, 20, 40, 80, 160, 480, 640, 960},
{0, 20, 40, 80, 160, 480, 640, 1280},
{0, 20, 40, 80, 160, 480, 960, 1280},
{0, 20, 40, 80, 160, 640, 960, 1280},
{0, 20, 40, 80, 320, 480, 640, 960},
{0, 20, 40, 80, 320, 480, 640, 1280},
{0, 20, 40, 80, 320, 480, 960, 1280},
{0, 20, 40, 80, 320, 640, 960, 1280},
{0, 20, 40, 80, 480, 640, 960, 1280},
{0, 20, 40, 160, 320, 480, 640, 960},
{0, 20, 40, 160, 320, 480, 640, 1280},
{0, 20, 40, 160, 320, 480, 960, 1280},
{0, 20, 40, 160, 320, 640, 960, 1280},
{0, 20, 40, 160, 480, 640, 960, 1280},
{0, 20, 40, 320, 480, 640, 960, 1280},
{0, 20, 80, 160, 320, 480, 640, 960},
{0, 20, 80, 160, 320, 480, 640, 1280},
{0, 20, 80, 160, 320, 480, 960, 1280},
{0, 20, 80, 160, 320, 640, 960, 1280},
{0, 20, 80, 160, 480, 640, 960, 1280},
{0, 20, 80, 320, 480, 640, 960, 1280},
{0, 20, 160, 320, 480, 640, 960, 1280},
{0, 40, 80, 160, 320, 480, 640, 960},
{0, 40, 80, 160, 320, 480, 640, 1280},
{0, 40, 80, 160, 320, 480, 960, 1280},
{0, 40, 80, 160, 320, 640, 960, 1280},
{0, 40, 80, 160, 480, 640, 960, 1280},
{0, 40, 80, 320, 480, 640, 960, 1280},
{0, 40, 160, 320, 480, 640, 960, 1280},
{0, 80, 160, 320, 480, 640, 960, 1280},
{5, 10, 20, 40, 80, 160, 320, 480},
{5, 10, 20, 40, 80, 160, 320, 640},
{5, 10, 20, 40, 80, 160, 320, 960},
{5, 10, 20, 40, 80, 160, 320, 1280},
{5, 10, 20, 40, 80, 160, 480, 640},
{5, 10, 20, 40, 80, 160, 480, 960},
{5, 10, 20, 40, 80, 160, 480, 1280},
{5, 10, 20, 40, 80, 160, 640, 960},
{5, 10, 20, 40, 80, 160, 640, 1280},
{5, 10, 20, 40, 80, 160, 960, 1280},
{5, 10, 20, 40, 80, 320, 480, 640},
{5, 10, 20, 40, 80, 320, 480, 960},
{5, 10, 20, 40, 80, 320, 480, 1280},
{5, 10, 20, 40, 80, 320, 640, 960},
{5, 10, 20, 40, 80, 320, 640, 1280},
{5, 10, 20, 40, 80, 320, 960, 1280},
{5, 10, 20, 40, 80, 480, 640, 960},
{5, 10, 20, 40, 80, 480, 640, 1280},
{5, 10, 20, 40, 80, 480, 960, 1280},
{5, 10, 20, 40, 80, 640, 960, 1280},
{5, 10, 20, 40, 160, 320, 480, 640},
{5, 10, 20, 40, 160, 320, 480, 960},
{5, 10, 20, 40, 160, 320, 480, 1280},
{5, 10, 20, 40, 160, 320, 640, 960},
{5, 10, 20, 40, 160, 320, 640, 1280},
{5, 10, 20, 40, 160, 320, 960, 1280},
{5, 10, 20, 40, 160, 480, 640, 960},
{5, 10, 20, 40, 160, 480, 640, 1280},
{5, 10, 20, 40, 160, 480, 960, 1280},
{5, 10, 20, 40, 160, 640, 960, 1280},
{5, 10, 20, 40, 320, 480, 640, 960},
{5, 10, 20, 40, 320, 480, 640, 1280},
{5, 10, 20, 40, 320, 480, 960, 1280},
{5, 10, 20, 40, 320, 640, 960, 1280}, {5, 10, 20, 40, 480, 640, 960, 1280},
{5, 10, 20, 80, 160, 320, 480, 640},
{5, 10, 20, 80, 160, 320, 480, 960},
{5, 10, 20, 80, 160, 320, 480, 1280},
{5, 10, 20, 80, 160, 320, 640, 960},
{5, 10, 20, 80, 160, 320, 640, 1280},
{5, 10, 20, 80, 160, 320, 960, 1280},
{5, 10, 20, 80, 160, 480, 640, 960},
{5, 10, 20, 80, 160, 480, 640, 1280},
{5, 10, 20, 80, 160, 480, 960, 1280},
{5, 10, 20, 80, 160, 640, 960, 1280},
{5, 10, 20, 80, 320, 480, 640, 960},
{5, 10, 20, 80, 320, 480, 640, 1280},
{5, 10, 20, 80, 320, 480, 960, 1280},
{5, 10, 20, 80, 320, 640, 960, 1280},
{5, 10, 20, 80, 480, 640, 960, 1280},
{5, 10, 20, 160, 320, 480, 640, 960},
{5, 10, 20, 160, 320, 480, 640, 1280},
{5, 10, 20, 160, 320, 480, 960, 1280},
{5, 10, 20, 160, 320, 640, 960, 1280},
{5, 10, 20, 160, 480, 640, 960, 1280},
{5, 10, 20, 320, 480, 640, 960, 1280},
{5, 10, 40, 80, 160, 320, 480, 640},
{5, 10, 40, 80, 160, 320, 480, 960},
{5, 10, 40, 80, 160, 320, 480, 1280},
{5, 10, 40, 80, 160, 320, 640, 960},
{5, 10, 40, 80, 160, 320, 640, 1280},
{5, 10, 40, 80, 160, 320, 960, 1280},
{5, 10, 40, 80, 160, 480, 640, 960},
{5, 10, 40, 80, 160, 480, 640, 1280},
{5, 10, 40, 80, 160, 480, 960, 1280},
{5, 10, 40, 80, 160, 640, 960, 1280},
{5, 10, 40, 80, 320, 480, 640, 960},
{5, 10, 40, 80, 320, 480, 640, 1280},
{5, 10, 40, 80, 320, 480, 960, 1280},
{5, 10, 40, 80, 320, 640, 960, 1280},
{5, 10, 40, 80, 480, 640, 960, 1280},
{5, 10, 40, 160, 320, 480, 640, 960},
{5, 10, 40, 160, 320, 480, 640, 1280},
{5, 10, 40, 160, 320, 480, 960, 1280},
{5, 10, 40, 160, 320, 640, 960, 1280},
{5, 10, 40, 160, 480, 640, 960, 1280},
{5, 10, 40, 320, 480, 640, 960, 1280},
{5, 10, 80, 160, 320, 480, 640, 960},
{5, 10, 80, 160, 320, 480, 640, 1280},
{5, 10, 80, 160, 320, 480, 960, 1280},
{5, 10, 80, 160, 320, 640, 960, 1280},
{5, 10, 80, 160, 480, 640, 960, 1280},
{5, 10, 80, 320, 480, 640, 960, 1280},
{5, 10, 160, 320, 480, 640, 960, 1280},
{5, 20, 40, 80, 160, 320, 480, 640},
{5, 20, 40, 80, 160, 320, 480, 960},
{5, 20, 40, 80, 160, 320, 480, 1280},
{5, 20, 40, 80, 160, 320, 640, 960},
{5, 20, 40, 80, 160, 320, 640, 1280},
{5, 20, 40, 80, 160, 320, 960, 1280},
{5, 20, 40, 80, 160, 480, 640, 960},
{5, 20, 40, 80, 160, 480, 640, 1280},
{5, 20, 40, 80, 160, 480, 960, 1280},
{5, 20, 40, 80, 160, 640, 960, 1280},
{5, 20, 40, 80, 320, 480, 640, 960},
{5, 20, 40, 80, 320, 480, 640, 1280},
{5, 20, 40, 80, 320, 480, 960, 1280},
{5, 20, 40, 80, 320, 640, 960, 1280},
{5, 20, 40, 80, 480, 640, 960, 1280},
{5, 20, 40, 160, 320, 480, 640, 960},
{5, 20, 40, 160, 320, 480, 640, 1280},
{5, 20, 40, 160, 320, 480, 960, 1280},
{5, 20, 40, 160, 320, 640, 960, 1280},
{5, 20, 40, 160, 480, 640, 960, 1280},
{5, 20, 40, 320, 480, 640, 960, 1280},
{5, 20, 80, 160, 320, 480, 640, 960},
{5, 20, 80, 160, 320, 480, 640, 1280},
{5, 20, 80, 160, 320, 480, 960, 1280},
{5, 20, 80, 160, 320, 640, 960, 1280},
{5, 20, 80, 160, 480, 640, 960, 1280},
{5, 20, 80, 320, 480, 640, 960, 1280},
{5, 20, 160, 320, 480, 640, 960, 1280},
{5, 40, 80, 160, 320, 480, 640, 960},
{5, 40, 80, 160, 320, 480, 640, 1280},
{5, 40, 80, 160, 320, 480, 960, 1280},
{5, 40, 80, 160, 320, 640, 960, 1280},
{5, 40, 80, 160, 480, 640, 960, 1280},
{5, 40, 80, 320, 480, 640, 960, 1280},
{5, 40, 160, 320, 480, 640, 960, 1280},
{5, 80, 160, 320, 480, 640, 960, 1280},
{10, 20, 40, 80, 160, 320, 480, 640},
{10, 20, 40, 80, 160, 320, 480, 960},
{10, 20, 40, 80, 160, 320, 480, 1280},
{10, 20, 40, 80, 160, 320, 640, 960},
{10, 20, 40, 80, 160, 320, 640, 1280},
{10, 20, 40, 80, 160, 320, 960, 1280},
{10, 20, 40, 80, 160, 480, 640, 960},
{10, 20, 40, 80, 160, 480, 640, 1280},
{10, 20, 40, 80, 160, 480, 960, 1280},
{10, 20, 40, 80, 160, 640, 960, 1280},
{10, 20, 40, 80, 320, 480, 640, 960},
{10, 20, 40, 80, 320, 480, 640, 1280},
{10, 20, 40, 80, 320, 480, 960, 1280},
{10, 20, 40, 80, 320, 640, 960, 1280},
{10, 20, 40, 80, 480, 640, 960, 1280},
{10, 20, 40, 160, 320, 480, 640, 960},
{10, 20, 40, 160, 320, 480, 640, 1280},
{10, 20, 40, 160, 320, 480, 960, 1280},
{10, 20, 40, 160, 320, 640, 960, 1280},
{10, 20, 40, 160, 480, 640, 960, 1280},
{10, 20, 40, 320, 480, 640, 960, 1280},
{10, 20, 80, 160, 320, 480, 640, 960},
{10, 20, 80, 160, 320, 480, 640, 1280},
{10, 20, 80, 160, 320, 480, 960, 1280},
{10, 20, 80, 160, 320, 640, 960, 1280},
{10, 20, 80, 160, 480, 640, 960, 1280},
{10, 20, 80, 320, 480, 640, 960, 1280},
{10, 20, 160, 320, 480, 640, 960, 1280},
{10, 40, 80, 160, 320, 480, 640, 960},
{10, 40, 80, 160, 320, 480, 640, 1280},
{10, 40, 80, 160, 320, 480, 960, 1280},
{10, 40, 80, 160, 320, 640, 960, 1280},
{10, 40, 80, 160, 480, 640, 960, 1280},
{10, 40, 80, 320, 480, 640, 960, 1280},
{10, 40, 160, 320, 480, 640, 960, 1280},
{10, 80, 160, 320, 480, 640, 960, 1280},
{20, 40, 80, 160, 320, 480, 640, 960},
{20, 40, 80, 160, 320, 480, 640, 1280},
{20, 40, 80, 160, 320, 480, 960, 1280},
{20, 40, 80, 160, 320, 640, 960, 1280},
{20, 40, 80, 160, 480, 640, 960, 1280},
{20, 40, 80, 320, 480, 640, 960, 1280},
{20, 40, 160, 320, 480, 640, 960, 1280},
{20, 80, 160, 320, 480, 640, 960, 1280},
{40, 80, 160, 320, 480, 640, 960, 1280}.

Examples of various value ranges of the configured period of the random access channel transmitting resource and the offset of the random access channel transmitting resource in the configured period are shown above. It should be noted that in specific implementation, the value of the offset cannot go beyond the scope of the configured period. For example, when the configured period is 40 milliseconds, the selected value of the offset cannot be greater than 40 milliseconds, for example, may be 5, 10, 20 milliseconds or the like.

As an example, in the TDD mode, NB-IoT may support a plurality of preamble formats. The main difference between different preamble formats is that CP lengths may be different, the number of symbols in one symbol group (SG) may be different, time lengths of guard time (GT) may be different, or the numbers of symbol groups included in one preamble may also be different. As an implementation, reference may be made to the table in FIG. 3. FIG. 3 schematically shows different preamble formats. In FIG. 3, each row may correspond to parameters of one preamble format.

As an example, in the TDD mode, an available number of retransmissions of the NPRACH or preamble of NB-IoT is related to the preamble format. For example, each preamble format shown in FIG. 3 may have a corresponding NPRACH or preamble retransmission number/retransmission number set. In this case, a currently configured preamble format can determine a preamble retransmission number that can be used.

As an example, in the TDD mode, an available period of the NPRACH of NB-IoT is related to the preamble format. For example, each preamble format shown in FIG. 3 may have a corresponding NPRACH period. In this case, a currently configured preamble format can determine an available period of the NPRACH.

Then, in step S120: Transmit the configuration information to UE.

FIG. 3 schematically shows a flowchart of a method for configuring a random access channel transmitting resource at UE.

Figure 4:
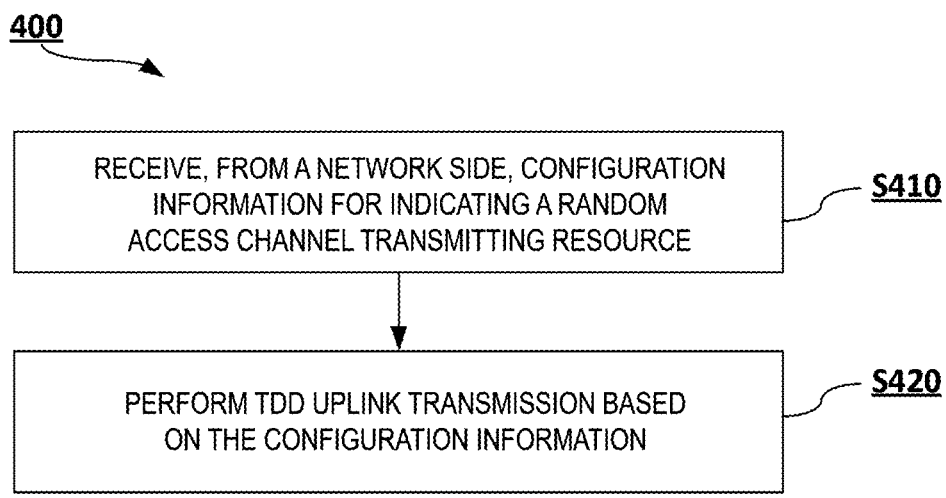
FIG. 4 schematically shows a flowchart of a method for generating an NPRACH time-domain resource indication in a TDD scenario.

FIG. 4 schematically shows a flowchart of a method 400 for generating an NPRACH time-domain resource indication in a TDD scenario. The method may be, for example, performed by user equipment.

As shown in FIG. 4, in step S410: Receive, from a network side (for example, a base station), configuration information for indicating a random access channel transmitting resource.

The configuration information may include period indicating information for indicating a configured period of the random access channel transmitting resource, and/or offset indicating information for indicating an offset of the random access channel transmitting resource in the configured period. In the following specific description, an NPRACH time-domain resource is used as an example of the random access channel transmitting resource.

Step S420: Perform TDD uplink transmission based on the received configuration information.

As an example, the UE may perform NPRACH transmission on an SFN meeting the following requirement:

(SFN−Intra-resource period offset)mod(Resource period/Length of radio frame)=0, where the SFN is a current system frame number of the UE, and the intra-resource period offset is in units of radio frames.

As another example, the UE may perform NPRACH transmission on an SFN meeting the following requirement:

(SFN−Intra-resource period offset/Length of radio frame)mod(Resource period/Length of radio frame)=0, where the SFN is a current system frame number of the UE, and the intra-resource period offset is in units of milliseconds.

As another example, the UE may perform NPRACH transmission on a half radio frame meeting the following requirement:

(H-SFN−Intra-resource period offset)mod(Resource period/Length of radio frame)=0, where the H-SFN is a current half system frame number of the UE, and the intra-resource period offset is in units of half radio frames.

As another example, the UE may perform NPRACH transmission on a half radio frame meeting the following requirement:

(H-SFN−Intra-resource period offset/Length of half radio frame)mod(Resource period/Length of radio frame)=0, where the H-SFN is a current half system frame number of the UE, and the intra-resource period offset is in units of milliseconds.

After a resource (for example, an SFN or H-SFN) for transmitting a random access channel (for example, an NPRACH) is determined, a random access signal may be transmitted on the resource.

In an example, the length of the radio frame or the length of the half radio frame at the denominator in the aforementioned equations may take a value according to needs, the unit of which may be, for example, milliseconds, and certainly, may also be any unit of time consistent with the offset and the configured period. For example, in the NB-IoT system in the example shown in the embodiment of the present invention, the length of the radio frame may be 10 (milliseconds), and the length of the half radio frame may be 5 (milliseconds).

Figure 5:
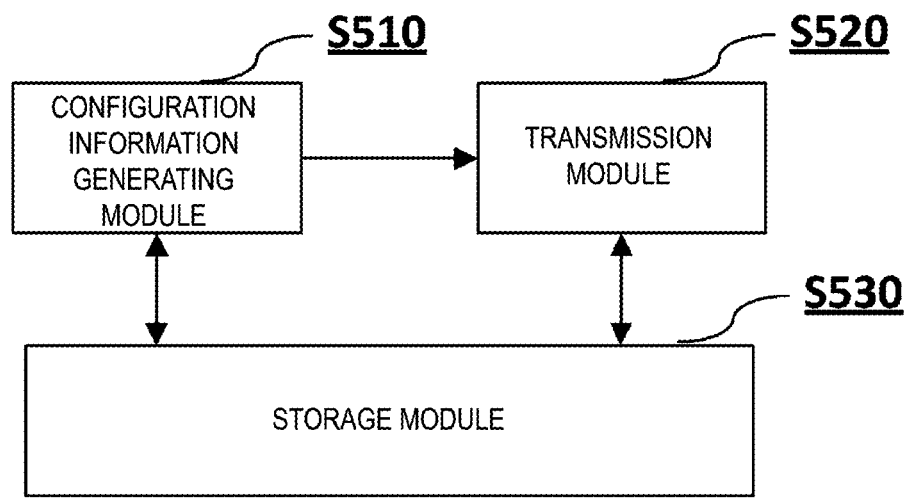
FIG. 5 schematically shows a schematic block diagram of a device for configuring a random access channel transmitting resource in a TDD mode according to an embodiment of the present disclosure.

FIG. 5 schematically shows a schematic block diagram of a device for configuring a random access channel transmitting resource in a TDD mode according to an embodiment of the present disclosure. The device shown in FIG. 5 corresponds to the network-side device for implementing the method shown in FIG. 1, for example, the base station.

As shown in FIG. 5, the device includes a configuration information generating module 510 and a transmission module 520.

The configuration information generating module 510 is configured to generate configuration information for indicating a random access channel transmitting resource. The configuration information includes period indicating information for indicating a configured period of the random access channel transmitting resource, and/or offset indicating information for indicating an offset of the random access channel transmitting resource in the configured period.

The transmission module 520 is configured to transmit the configuration information to user equipment (UE).

In some examples, the configured period may be in units of milliseconds.

In some examples, the offset indicated by the offset indicating information may be in units of milliseconds, radio frames, or half radio frames.

In some examples, in the case that the offset indicating information is in units of radio frames, the random access channel transmitting resource may be configured at the following position: a second subframe in a radio frame; a seventh subframe in a radio frame; or a second or seventh subframe in a radio frame.

In some examples, in the case that the offset indicating information is in units of half radio frames, the random access channel transmitting resource may be configured at the following position: a second subframe in a half radio frame.

The device shown in FIG. 5 may further include a storage module 530 configured to store information to be used or possibly used in the operation of the configuration information generating module 510 and the transmission module 520, and/or store information generated in the operation of the configuration information generating module 510 and the transmission module 520.

It should be noted that to make the technical solution in the embodiment of the present invention concise, components irrelevant to the implementation of the technical solution in the embodiment of the present invention are omitted in FIG. 5. In specific implementation of related devices, those skilled in the art can add any required device, for example, an input/output device or a display, according to actual needs. The technical solution in the embodiment of the present invention is not limited to the example shown in FIG. 5.

Figure 6:
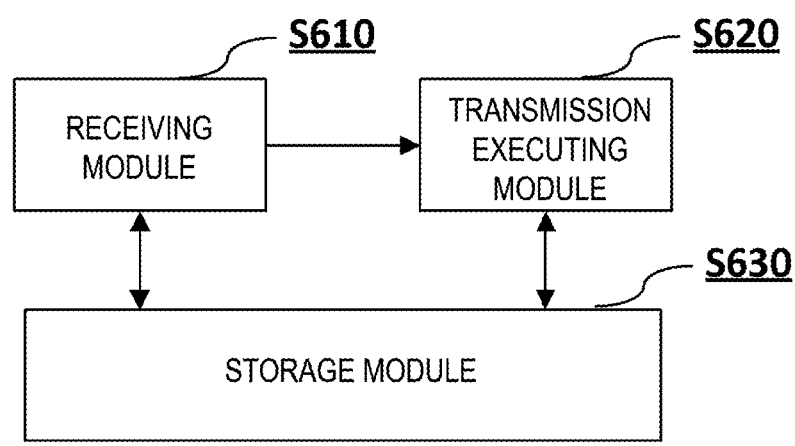
FIG. 6 schematically shows a schematic block diagram of a device for configuring a random access channel transmitting resource in a TDD mode according to an embodiment of the present disclosure.

FIG. 6 schematically shows a schematic block diagram of a device for configuring a random access channel transmitting resource in a TDD mode according to an embodiment of the present disclosure. The device shown in FIG. 6 corresponds to the user equipment (UE) for implementing the method shown in FIG. 4.

As shown in FIG. 6, the device includes a receiving module 610 and a transmission executing module 620.

The receiving module 610 is configured to receive, from a network side (for example, a base station), configuration information for indicating a random access channel transmitting resource. The configuration information includes period indicating information for indicating a configured period of the random access channel transmitting resource, and/or offset indicating information for indicating an offset of the random access channel transmitting resource in the configured period.

The transmission executing module 620 is configured to perform TDD uplink transmission based on the configuration information.

The device shown in FIG. 6 may further include a storage module 630 configured to store information to be used or possibly used in the operation of the receiving module 610 and the transmission executing module 620, and/or store information generated in the operation of the receiving module 610 and the transmission executing module 620.

In some examples, the transmission executing module 620 may transmit a random access signal on a resource satisfying one of the following equations:

(SFN−Intra-resource period offset) mod (Resource period/Length of radio frame)=0, where the SFN is a current system frame number, the intra-resource period offset is the offset indicated by the offset indicating information and is in units of radio frames, and the resource period is the configured period indicated by the period indicating information, or (SFN−Intra-resource period offset/Length of radio frame) mod (Resource period/Length of radio frame)=0, where the SFN is a current system frame number, the intra-resource period offset is the offset indicated by the offset indicating information and is in units of milliseconds, and the resource period is the configured period indicated by the period indicating information, or (H-SFN−Intra-resource period offset) mod (Resource period/Length of radio frame)=0, where the H-SFN is a current half system frame number, the intra-resource period offset is the offset indicated by the offset indicating information and is in units of half radio frames, and the resource period is the configured period indicated by the period indicating information, or (H-SFN−Intra-resource period offset/Length of half radio frame) mod (Resource period/Length of radio frame)=0, where the H-SFN is a current half system frame number, the intra-resource period offset is the offset indicated by the offset indicating information and is in units of milliseconds, and the resource period is the configured period indicated by the period indicating information.

It should be noted that to make the technical solution in the embodiment of the present invention concise, components irrelevant to the implementation of the technical solution in the embodiment of the present invention are omitted in FIG. 6. In specific implementation of related devices, those skilled in the art can add any required device, for example, an input/output device or a display, according to actual needs. The technical solution in the embodiment of the present invention is not limited to the example shown in FIG. 6.

Figure 7:
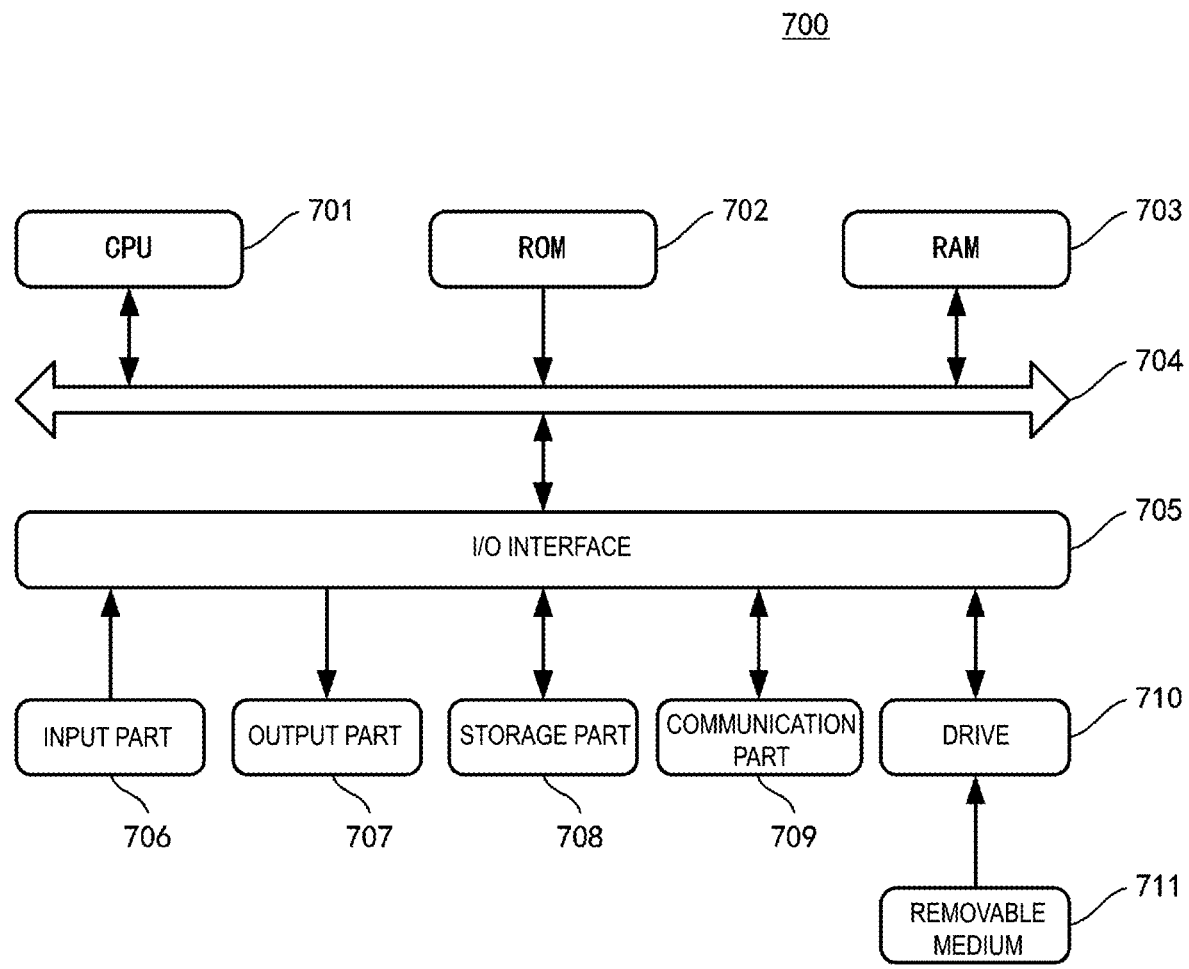
FIG. 7 schematically shows a schematic block diagram of a device for configuring a random access channel transmitting resource in a TDD mode according to an embodiment of the present disclosure.

FIG. 7 schematically shows a schematic block diagram of a device for configuring a random access channel transmitting resource in a TDD mode according to an embodiment of the present disclosure. The device shown in FIG. 7 may correspond to the device shown in FIG. 5 (for example, the base station) or the device shown in FIG. 6 (for example, the user equipment). It should be noted that the device shown in FIG. 7 is merely an example, and should not impose any limitation to the function and use scope of the embodiments of the present disclosure.

As shown in FIG. 7, the device 700 according to this embodiment includes a central processing unit (CPU) 701 that can perform various proper actions and processing according to a program stored in a read-only memory (ROM) 702 or a program loaded from a storage part 708 to a random access memory (RAM) 703. The RAM 703 further stores various programs and data required for the operation of the device 700. The CPU 701, the ROM 702, and the RAM 703 are connected to each other via a bus 704. An input/output (I/O) interface 705 is also connected to the bus 704.

The device 700 may further include one or more of the following components connected to the I/O interface 705: an input part 706 including a keyboard, a mouse, and the like; an output part 707 including a cathode ray tube (CRT), a liquid crystal display (LCD), a loudspeaker, and the like; a storage part 708 including a hard disk and the like; and a communication part 709 including a network interface card such as a LAN card or a modem. The communication part 709 performs communication processing via a network such as the Internet. A drive 710 is also connected to the I/O interface 705 as required. A removable medium 711, such as a magnetic disk, an optical disc, a magneto-optical disk, or a semiconductor memory, is installed on the drive 710 as required so that a computer program read therefrom is installed in the storage part 708 as required.

Particularly, according to an embodiment of the present disclosure, the process described above with reference to the flowchart may be implemented as a computer software program. For example, an embodiment of the present disclosure includes a computer program product, which includes a computer program carried on a computer-readable medium. The computer program includes program code for executing the method shown in the flowchart. In such an embodiment, the computer program may be downloaded and installed from a network via the communication part 709, and/or installed from the removable medium 711. When executed by the central processing unit (CPU) 701, the computer program executes the aforementioned functions defined in the device according to the embodiment of the present disclosure.

It should be noted that the computer-readable medium shown in the present disclosure may be a computer-readable signal medium or a computer-readable storage medium or any combination thereof. The computer-readable storage medium may be, for example, but not limited to, electrical, magnetic, optical, electromagnetic, infrared, or semiconductor systems, apparatuses, or devices, or any combination thereof. More specific examples of the computer-readable storage medium may include, but not limited to the following: an electrical connection having one or a plurality of wires, a portable computer disk, a hard disk, a random access memory (RAM), a read-only memory (ROM), an erasable programmable read-only memory (EPROM or a flash memory), an optical fiber, a portable compact disc read only memory (CD-ROM), an optical storage device, a magnetic storage device, or any suitable combination thereof. In the present disclosure, the computer-readable storage medium may be any tangible medium including or storing a program that can be used by or used in conjunction with an instruction executing system, apparatus, or device. In the present disclosure, the computer-readable signal medium may include a data signal which propagates in a baseband or as part of a carrier, and which carries computer-readable program code. Such a propagating data signal may be in a variety of forms including, but not limited to, an electromagnetic signal, an optical signal, or any suitable combination thereof. The computer-readable signal medium may also be any computer-readable medium other than the computer-readable storage medium. The computer-readable medium can send, propagate, or transmit a program for use by or in conjunction with an instruction executing system, apparatus, or device. The program code included in the computer-readable medium may be transmitted using any suitable medium, including, but not limited to: a wireless connection, a wire, an optical cable, an RF signal, or the like, or any suitable combination thereof.

The program running on the device according to the present invention may be a program that enables the computer to implement the functions of the embodiments of the present invention by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions may be implemented by the computer system through reading programs recorded on the recording medium and executing them. The so-called "computer system" herein may be a computer system embedded in the device, which may include an operating system or hardware (for example, peripherals). The "computer-readable recording medium" may be a semiconductor recording medium, an optical recording medium, a magnetic recording medium, a recording medium for programs that are dynamically stored for a short time, or any other computer-readable recording medium.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be an existing processor, a controller, a microcontroller, or a state machine. The circuit may be a digital circuit or an analog circuit. When new integrated circuit technologies that replace existing integrated circuits emerge because of the advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulted from the appropriate combinations of the technical means disclosed in different embodiments are also included within the technical scope of the present invention. In addition, components with the same effect described in the embodiments above may be replaced with one another.

The invention claimed is:

1. A method performed by a user equipment, the method comprising:
   receiving Narrowband Physical Random Access Channel (NPRACH) configurations for Time Division Duplex (TDD), the NPRACH configurations including first information for indicating an NPRACH periodicity (P), with a value chosen from a set {80 ms, 160 ms, 320 ms, 640 ms, 1280 ms, 2560 ms, 5120 ms, 10240 ms}, and second information for indicating an NPRACH offset (O), in unit of radio frame; and
   transmitting an NPRACH based on the NPRACH configurations, wherein
   NPRACH starts in a radio frame $n_f$ fulfilling $(n_f\text{-}O)$ mod $(P/10)=0$.

2. A user equipment, comprising:
   receiving circuitry configured to receive Narrowband Physical Random Access Channel (NPRACH) configurations for Time Division Duplex (TDD), the NPRACH configurations including first information for indicating an NPRACH periodicity (P), with a value chosen from a set {80 ms, 160 ms, 320 ms, 640 ms, 1280 ms, 2560 ms, 5120 ms, 10240 ms}, and second information for indicating an NPRACH offset (O), in unit of radio frame; and
   transmitting circuitry configured to transmit an NPRACH based on the NPRACH configurations, wherein
   the NPRACH starts in a radio frame $n_f$ fulfilling $(n_f\text{-}O)$ mod $(P/10)=0$.

3. A base station, comprising:

transmitting circuitry configured to transmit Narrowband Physical Random Access Channel (NPRACH) configurations for Time Division Duplex (TDD), the NPRACH configurations including first information for indicating an NPRACH periodicity (P), with a value chosen from a set {80 ms, 160 ms, 320 ms, 640 ms, 1280 ms, 2560 ms, 5120 ms, 10240 ms}, and second information for indicating an NPRACH offset (O), in unit of radio frame; and receiving circuitry configured to receive an NPRACH based on the NPRACH configurations, wherein NPRACH starts in a radio frame $n_f$ fulfilling $(n_f - O) \bmod (P/10) = 0$.

* * * * *